United States Patent
Murugesan et al.

(10) Patent No.: US 11,118,541 B2
(45) Date of Patent: Sep. 14, 2021

(54) TURBOCHARGER SUPPORT SYSTEM

(71) Applicant: Transportation IP Holdings, LLC, Norwalk, CT (US)

(72) Inventors: Ganesasubramanian Murugesan, Bangalore (IN); Akshay Kotecha, Grove City, PA (US); Kamala Hasan Pethuraj, Bangalore (IN); Michael Mendoza, Fredonia, PA (US); John Stephen Roth, Millcreek Township, PA (US); Sandeep Kanzal Venkatesha, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 58 days.

(21) Appl. No.: 16/688,712

(22) Filed: Nov. 19, 2019

(65) Prior Publication Data

US 2021/0148311 A1   May 20, 2021

(51) Int. Cl.
| | |
|---|---|
| *F02M 26/31* | (2016.01) |
| *F01D 25/28* | (2006.01) |
| *F02B 29/04* | (2006.01) |
| *F01M 11/02* | (2006.01) |

(52) U.S. Cl.
CPC ............ *F02M 26/31* (2016.02); *F01D 25/28* (2013.01); *F02B 29/045* (2013.01); *F02B 29/0493* (2013.01); *F01M 2011/021* (2013.01); *F02B 29/0412* (2013.01); *F02B 29/0462* (2013.01)

(58) Field of Classification Search
CPC ....... F02M 26/31; F01D 25/28; F02B 29/045; F02B 29/0412; F02B 29/0462; F01M 2011/021

USPC ................. 60/599, 605.3; 248/678
See application file for complete search history.

(56) References Cited

U.S. PATENT DOCUMENTS

| | | | | |
|---|---|---|---|---|
| 1,416,760 | A | * | 5/1922 | Steenstrup ............... F01D 25/28 |
| | | | | 248/678 |
| 3,022,740 | A | * | 2/1962 | Wilfley ................. F04D 29/628 |
| | | | | 415/126 |
| 4,372,120 | A | * | 2/1983 | Ford, Jr. ................. F02B 75/22 |
| | | | | 123/184.31 |

(Continued)

FOREIGN PATENT DOCUMENTS

| | | | | |
|---|---|---|---|---|
| GB | 2539903 A | * | 1/2017 | ............ F02B 29/045 |
| WO | WO-2010026293 A1 | * | 3/2010 | .......... F02B 29/0462 |

(Continued)

OTHER PUBLICATIONS

Murugesan, G. et al., "An Ornamental Design for a Support Bracket," U.S. Appl. No. 27/713,893, filed Nov. 19, 2019, 10 pages.

(Continued)

*Primary Examiner* — Thai Ba Trieu
(74) *Attorney, Agent, or Firm* — McCoy Russell LLP

(57) ABSTRACT

Systems are provided for a mounting assembly providing structural support to a pair of turbocharger and charge air coolers. In one example, the mounting assembly may include support brackets and pedestals for coupling the turbochargers and the charge air coolers to one structure. Separate channels for applying lubricant and coolant to the turbochargers and the charge air coolers may be coupled to the mounting assembly.

20 Claims, 13 Drawing Sheets

(56) References Cited

U.S. PATENT DOCUMENTS

| | | | | |
|---|---|---|---|---|
| 4,414,725 A * | 11/1983 | Breitweiser | ............. | F02B 39/00 29/402.08 |
| 5,908,017 A * | 6/1999 | Kaneko | ................ | F02M 35/161 123/195 A |
| 6,012,436 A * | 1/2000 | Boutcher | ................ | F02B 33/36 123/559.1 |
| 6,305,168 B1 * | 10/2001 | Furukawa | ............... | F02B 67/10 123/53.6 |
| 7,011,079 B2 * | 3/2006 | Park | ................. | F02M 35/10157 123/559.1 |
| 7,043,915 B2 * | 5/2006 | Anello | .................... | F01D 25/28 248/637 |
| 7,810,466 B2 * | 10/2010 | Preimesberger | ........ | F02B 67/10 123/195 A |
| 7,966,816 B1 * | 6/2011 | Matthews | ............. | F02B 37/007 60/612 |
| 8,215,113 B2 * | 7/2012 | Hudson | ................... | F02B 39/14 60/605.3 |
| 8,234,867 B2 * | 8/2012 | Palazzolo | ............. | F02B 39/005 60/605.3 |
| 8,245,511 B2 * | 8/2012 | Cowland | ............... | F02B 39/005 60/605.3 |
| 8,567,546 B2 * | 10/2013 | Berg | ......................... | F01P 3/18 180/190 |
| 9,303,552 B2 * | 4/2016 | Ozolins | ................... | F02B 37/00 |
| 2003/0106982 A1 * | 6/2003 | Battig | .................... | F01D 25/243 248/678 |
| 2005/0017151 A1 * | 1/2005 | Battig | ..................... | F02B 67/10 248/678 |
| 2017/0009628 A1 * | 1/2017 | Kimura | ............... | F01N 13/1855 |
| 2018/0363545 A1 * | 12/2018 | Higo | ....................... | F02B 67/10 |
| 2019/0226389 A1 * | 7/2019 | Byrd | ........................ | F02C 6/12 |
| 2020/0080452 A1 * | 3/2020 | Matsui | ...................... | F01P 5/06 |
| 2020/0095918 A1 * | 3/2020 | Uchibori | ............. | F01N 13/1805 |
| 2020/0102916 A1 * | 4/2020 | Suzuki | ................... | F02M 26/23 |
| 2020/0182134 A1 * | 6/2020 | Yoshida | .............. | F02B 29/0443 |

FOREIGN PATENT DOCUMENTS

| | | | | |
|---|---|---|---|---|
| WO | WO-2010076383 A1 * | 7/2010 | .......... | F02B 29/0412 |
| WO | WO-2012093200 A1 * | 7/2012 | ............ | F02B 37/013 |
| WO | WO-2013076369 A1 * | 5/2013 | ............ | F02B 29/045 |
| WO | WO-2013087990 A1 * | 6/2013 | .......... | F02B 29/0412 |
| WO | WO-2020048636 A1 * | 3/2020 | .......... | F02B 29/0412 |

OTHER PUBLICATIONS

Murugesan, G. et al., "An Ornamental Design for a Forwarding End Housing," U.S. Appl. No. 29/713,903, filed Nov. 19, 2019, 10 pages.

* cited by examiner

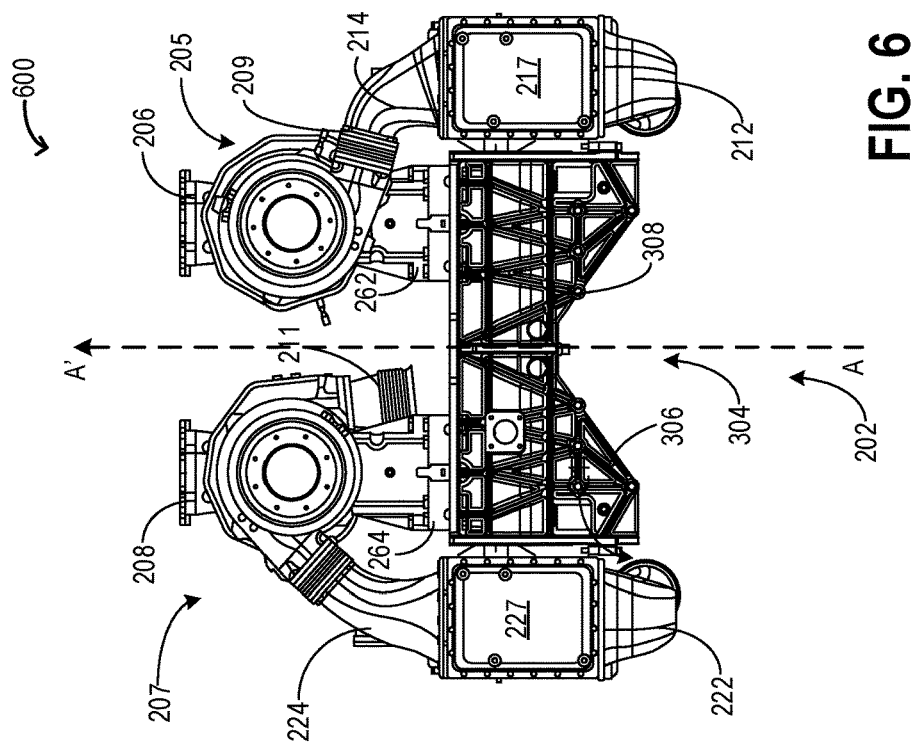
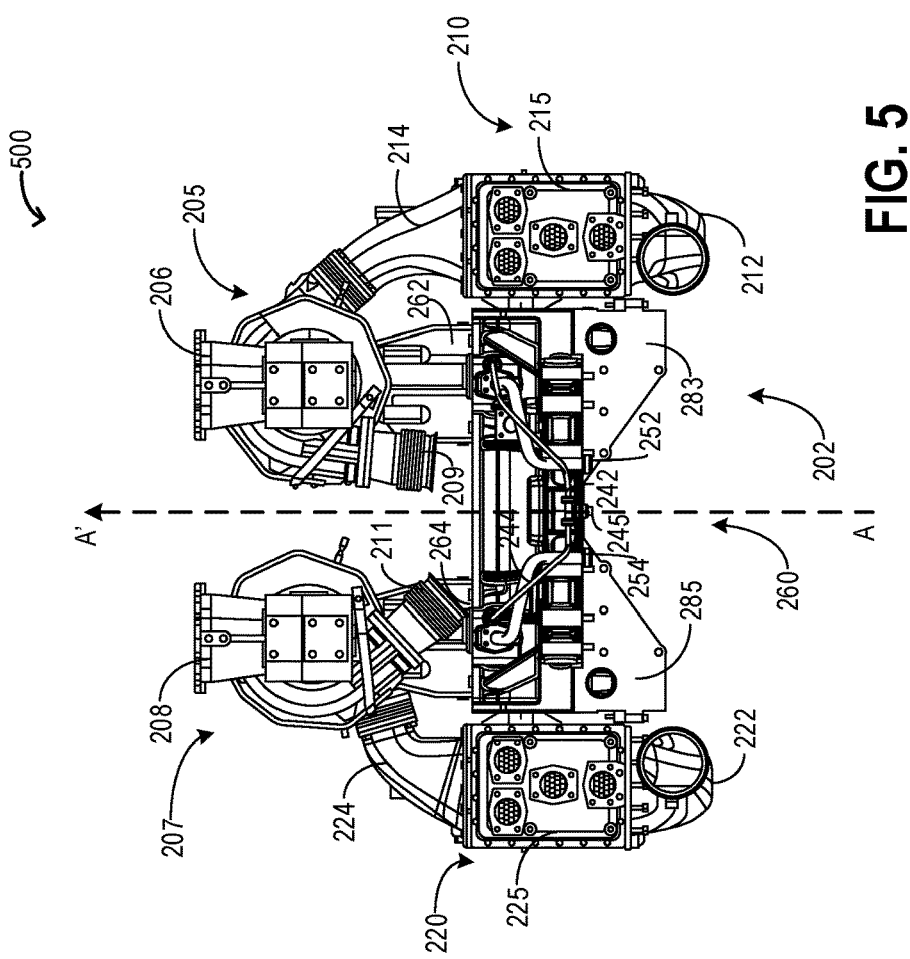

TURBOCHARGER SUPPORT SYSTEM

FIELD

Embodiments relate to engine systems with turbochargers. Other embodiments relate to mounting assemblies providing structural support to turbochargers and associated charge air coolers.

BACKGROUND

Turbochargers may be used to provide a boosted air charge to an engine. The boosted air charge enhances the fuel efficiency of internal combustion engines by augmenting the mass and pressure of air ingested in each cylinder during its intake stroke. A charge air cooler is coupled downstream of the turbocharger to cool the boosted air charge before it is delivered to the engine. Flow of coolant and/or oil through the charge air cooler enables rapid cooling of the boosted air charge.

Turbochargers and associated charge air coolers for large engines, such as locomotive engines, have to be fit in a limited amount of machinery space. Additional space is required for the various hardware components that are required to hold the turbocharger and charge air cooler in place, such as various brackets, fasteners, and connectors. The assembly of the bracket and hardware components can be laborious and time consuming. Incorrect assembly and mounting of the turbocharger and charge air cooler during engine manufacture can result in premature engine degradation. If the connections are not properly attached, they may generate unnecessary noise, vibration, and harshness. In addition, the joints may be prematurely damaged due to stress from engine vibrations.

BRIEF DESCRIPTION OF THE INVENTION

Methods and systems are provided for enabling reliable mounting of a turbocharger and associated charge air cooler assembly. The mounting structure may include a bracket for holding charge air cooler and additional pedestals mounted thereon for supporting the turbocharger. In addition, the bracket may include internal passages for integrating a cooling function into the structural component.

In one embodiment, a turbocharger support assembly includes: a rectangular prism base with an arcuate cutout along one long side of the base for engaging with an intake manifold, the rectangular base including a platform projecting out from each short side of the base for engaging with a charge air cooler; and a first and a second pedestal positioned on a top surface of the base, each of the first and second pedestal having a tapered front surface facing the arcuate cutout on the one long side of the base and a rectilinear back surface aligned with another long side of the base, the first pedestal supporting a first turbocharger mounted thereon, the second pedestal supporting a second turbocharger mounted thereon, wherein each of the first and second pedestal further includes at least two channels running through a pedestal body, the at least two channels coupled to corresponding channels extending through the rectangular prism base.

As an example, a mounting assembly may include a base and two pedestals positioned on the base. Each pedestal may provide support to a separate turbocharger. A first set of channels routing lubricating oil to and from a first turbocharger may include a plurality of transverse channels coupled to the base and a plurality of longitudinal channels passing through the pedestal supporting the first turbocharger. Similarly, a second set of channels routing lubricating oil to and from a second turbocharger may include a plurality of transverse channels coupled to the base and a plurality of longitudinal channels passing through the pedestal supporting the second turbocharger. A first charge air cooler coupled to the first turbocharger may be mounted on one side of the base while a second charge air cooler coupled to the second turbocharger may be mounted on another side of the base. Coolant may be circulated through each of the charge air coolers via coolant lines passing though the base.

In this manner, by using a single mounting assembly for supporting two turbochargers and two corresponding charge air coolers, a plurality of engine components may be assembled within a smaller area and within a shorter time. The pedestals may provide sturdy support for the turbochargers. By incorporating the lubricant channels and coolant lines within the mounting assembly, need for additional space within the engine for these passages may be eliminated, thereby making the arrangement compact. By positioning parts of the lubricant channels and coolant lines within components of the mounting assembly, exposure of the lubricant channels and coolant lines to external wear may be reduced. Overall, by using the turbocharger mounting assembly, the assembly may be made easier to manufacture without relying on additional production time and tooling costs. By including pedestals on the mounting assembly, turbochargers of different designs and sizes may be mounted to the same mounting assembly by suitably modifying only the pedestals. The pedestal being a components of small size and complexity compared to the entire mounting assembly, design effort, lead time and tooling cost for modifying the pedestal design may be lower compared to modifying the entire mounting assembly. In this way, manufacturing costs may be reduced by using the same design for the mounting assembly regardless of the size and structure of the turbochargers that are coupled to it.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF FIGURES

The present invention will be better understood from reading the following description of non-limiting embodiments, with reference to the attached drawings, wherein below:

FIG. 5 shows a back view of the turbocharger mounting assembly of FIG. 2.

FIG. 6 shows a front view of the turbocharger mounting assembly of FIG. 2.

DETAILED DESCRIPTION

Figure 1:
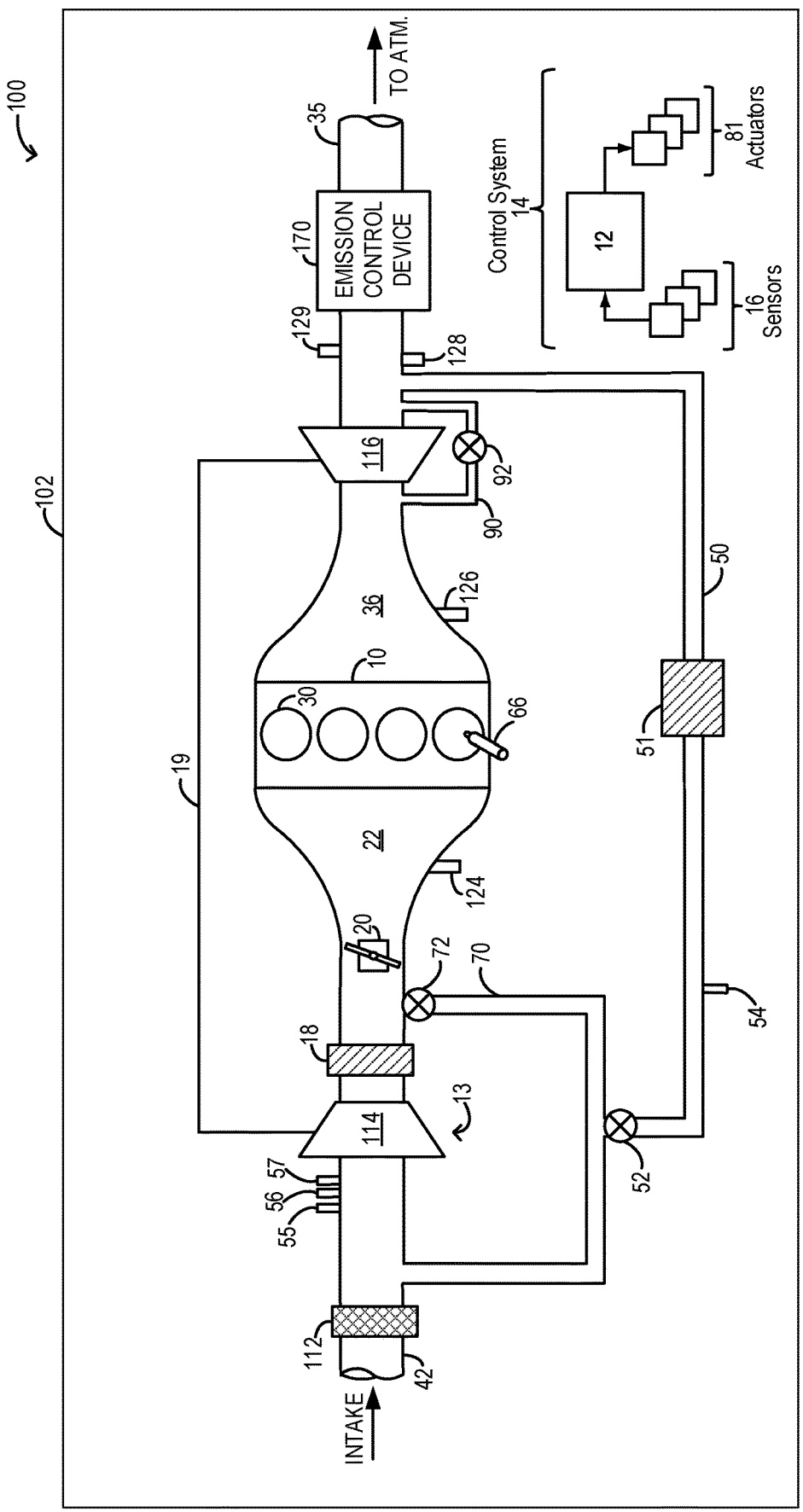
FIG. 1 shows an example embodiment of a boosted engine system.

FIG. 1 schematically shows aspects of an example engine system 100 including an engine 10 coupled to a vehicle system 102 (e.g., locomotive or other rail vehicle, other off-highway vehicle, marine vessel, etc.) or other powered system. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed. In further embodiments, two turbochargers each including a distinct compressor being driven by separate turbines may be coupled to the engine.

As shown in FIG. 1, compressor 114 is coupled, through charge-air cooler (CAC) 18 to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-water heat exchanger, for example. In the embodiment shown in FIG. 1, the pressure of the aircharge within the intake manifold is sensed by manifold air pressure (MAP) sensor 124. Since flow through the compressor can heat the compressed air, a downstream CAC 18 is provided so that boosted intake aircharge can be cooled prior to delivery to the engine intake. In another embodiment, two separate charge air coolers may be coupled to two separate turbochargers.

Due to space constraints within the engine, it may be difficult to mount two turbochargers along with two corresponding charge air coolers. A mounting assembly including a base and two pedestals may be used to effectively mount the turbochargers such that impact of vibration on the turbocharger components may be reduced, thereby lowering mechanical wear of the turbochargers. Lubricating oil (or another lubricant) may be circulated through the turbochargers to reduce friction and wear. The mounting assembly may include a plurality of channels to supply oil to the turbochargers. Also, a plurality of coolant lines circulating coolant (e.g., cold water) through the charge air coolers may be coupled to the mounting assembly. The mounting assembly together with the turbocharger and the charge air coolers are described in detail with relation to FIG. 2.

One or more sensors may be coupled to an inlet of compressor 114. For example, a temperature sensor 55 may be coupled to the inlet for measuring a compressor inlet temperature, and a pressure sensor 56 may be coupled to the inlet for measuring a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when EGR is enabled, the sensors may estimate a temperature, pressure, humidity, and air-fuel ratio of the aircharge mixture including fresh air, recirculated compressed air, and exhaust residuals received at the compressor inlet.

During selected conditions, such as during a tip-out, when going from engine operation with boost to engine operation without boost, compressor surge can occur. This is due to an increased pressure differential being generated across the compressor when the throttle closes at the tip-out. The increased pressure differential reduces forward flow through the compressor, causing surge and degraded turbocharger performance. In addition, surge can lead to NVH issues such as undesirable noise from the engine intake system. To relieve boost pressure and reduce compressor surge, at least a portion of the aircharge compressed by compressor 114 may be recirculated to the compressor inlet. This allows excess boost pressure to be substantially immediately relieved. The compressor recirculation system may include a compressor recirculation passage 70 for recirculating cooled compressed air from the compressor outlet, downstream of charge-air cooler 18 to the compressor inlet. In some embodiments, an additional compressor recirculation passage (not shown) may be provided for recirculating un-cooled (or warm) compressed air from the compressor outlet, upstream of charge-air cooler 18 to the compressor inlet.

A compressor recirculation valve (CRV) 72 may be coupled to compressor recirculation passage 70 (also referred to as compressor bypass) to control an amount of cooled compressor flow recirculated to the compressor inlet. In the depicted example, CRV 72 may be configured as a continuously variable valve wherein a position of the valve is continuously variable from a fully closed position to a fully open position and any position there-between. CRV 72 may be positioned in passage 70, downstream of CAC 18 and upstream of an inlet of compressor 114. A position of CRV 72 may be adjusted during boosted engine operation to improve peak performance and provide a margin to surge. In one example, the CRV may be maintained closed during boosted engine operation to improve boost response and peak performance. In another example, the CRV may be maintained partially open during boosted engine operation so as to provide some surge margin, in particular, an improved margin to soft surge.

Surge may also be relieved by reducing exhaust pressure at turbine 116. For example, a wastegate actuatable valve 92 may be actuated open to dump at least some exhaust pressure from upstream of the turbine to a location downstream of the turbine via bypath 90.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through bypath 90, bypassing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, a portion of the exhaust residuals may be diverted instead to EGR passage 50, through EGR cooler 51 and EGR valve 52, to the inlet of compressor 114. As such, EGR passage 50 couples the engine exhaust manifold, downstream of the turbine 116, with the engine intake manifold, upstream of compressor 114. In the depicted example, EGR passage 50 is shown merging with compressor recirculation passage 70 upstream of the compressor inlet. It will be appreciated that in alternate examples, the passages may not merge and the EGR passage may be coupled to the compressor inlet independent of the compressor recirculation passage.

EGR valve 52 may be opened to admit a controlled amount of cooled exhaust gas to the compressor inlet for desirable combustion and emissions-control performance. In this way, engine system 10 is adapted to provide external, low-pressure (LP) EGR by tapping exhaust gas from downstream of turbine 116. EGR valve 52 may also be configured as a continuously variable valve. In an alternate example, however, EGR valve 52 may be configured as an on/off valve. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

EGR cooler 51 may be coupled to EGR passage 50 for cooling EGR delivered to the compressor. In addition, one or more sensors may be coupled to EGR passage 50 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor 54 may be provided for estimating an air-fuel ratio of the EGR. Alternatively, EGR conditions may be inferred by the one or more temperature, pressure, humidity sensors 55-57 and/or air-fuel sensor 54 coupled to the compressor inlet. An opening of the EGR valve may be adjusted based on the engine operating conditions and the EGR conditions to provide a desired amount of engine dilution.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, compressor recirculation valve 72, wastegate 92, and fuel injector 66. The control system 14 may include a controller 12. The controller may receive input data from the various sensors, process the input data, and trigger various actuators in response to the processed input data based on instruction or code programmed therein corresponding to one or more routines.

Figure 2:
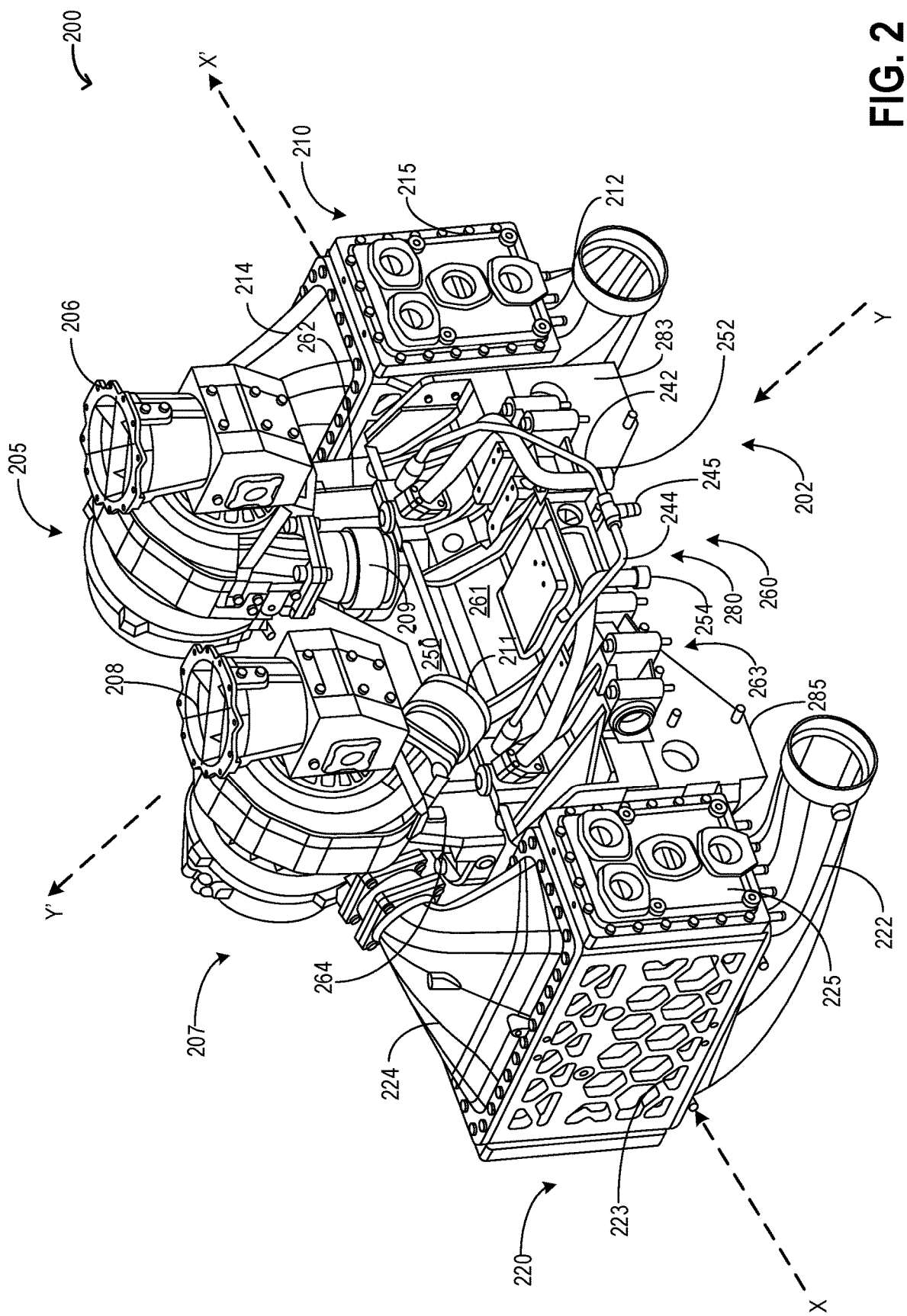
FIG. 2 shows a perspective view of a turbocharger mounting assembly with a pair of turbochargers and a pair of charge air coolers attached to the mounting assembly, when viewed from the back.

FIG. 2 shows a perspective view 200 of a turbocharger mounting assembly 202 (also referred herein as base) with a pair of turbochargers and a pair of charge air coolers attached to the mounting assembly, when viewed from the back. The mounting assembly 202 may include a base (e.g., a rectangular prism base) having a top surface 250, two side surfaces, a front surface, and a rear surface 260. The rear surface 260 may be a stepped surface including a first (also referred herein as rear) face 261 and a second (also referred herein as front) face 263. That is, the rear surface 260 may include a sloping first face leading to a rectilinear second face 263. The first face may be proximal to the front surface relative to the second face. Edges of the front surface and the rear surfaces may be longer in size relative to the edges of side surfaces.

A first pedestal 262 and a second pedestal 264 may be mounted on the top surface 250. The first pedestal 262 may be positioned closer to a first side surface while the second pedestal 264 may be positioned closer to a second side surface with a gap between the two pedestals. A first turbocharger 205 may be attached to and supported by the first pedestal 262 and a second turbocharger 207 may be attached to and supported by the second pedestal 264. Each of the first turbocharger and the second turbocharger may be positioned atop the mounting assembly 202. The turbochargers may be coupled to the respective pedestals via a plurality of fasteners and/or welded surfaces. Exhaust from the combustion chambers may enter the first turbocharger 205 via a first turbine inlet 206 and then exit the first turbocharger 205 via a first turbine outlet 209. Exhaust from the combustion chambers may enter the second turbocharger 207 via a second turbine inlet 208 and then exit the second turbocharger 207 via a second turbine outlet 211. As the exhaust flows through the turbines of the respective turbochargers, the turbine may rotate causing the corresponding compressor (connected by a shaft) to rotate, drawing in ambient charge air.

A first charge air cooler (CAC) 210 may be attached to the first side of the mounting assembly 202 and a second charge air cooler 220 may be attached to the second side of the mounting assembly 202. In the perspective view 200, a back surface 215 of the first CAC is seen while a back surface 225 and a side surface 223 of the second CAC 220 is seen. The back surfaces 215 and 225 may be aligned with the second face 263 of mounting assembly 202.

Compressed air from the first turbocharger 205 may enter the first CAC 210 via a first inlet plenum 214 and after being cooled at the first CAC 210, the compressed cold air may enter the intake manifold via the first outlet plenum 212. Similarly, compressed air from the second turbocharger 207 may enter the second CAC 220 via a second inlet plenum 224 and after being cooled at the second CAC 220, the compressed cold air may enter the intake manifold via the second outlet plenum 222. The first inlet plenum 214 and the second inlet plenum 224 may be positioned on the top surfaces of the respective first CAC 210 and the second CAC 220 while the first outlet plenum 212 and the second outlet plenum 222 may be positioned on the lower surfaces of the respective first CAC 210 and the second CAC 220. Each of the first inlet plenum 214 and the second inlet plenum 224 may comprise a narrower end coupled to the turbocharger (compressor outlet) and a wider end coupled to an upper surface of the respective CAC. Each of the first outlet plenum 212 and the second outlet plenum 222 may comprise a wider end coupled to a lower surface of the respective CAC and a narrower end leading to the engine intake manifold.

The second face 263 of mounting assembly 202 may include a first trapezoidal projection 283 extending downward from the lower surface of the mounting assembly 202 and a second trapezoidal projection 285 extending downward from the lower surface of the mounting assembly 202. The first trapezoidal projection 283 may be positioned closer to the first side surface while the second trapezoidal projection 285 may be positioned closer to a second side surface with a gap between the two pedestals. An arcuate cutout may be formed at the gap (interface of the two trapezoidal projections) between the two projections.

As used herein, the term "cutout" refers to a structural feature as described but which may be formed or created using different manufacturing techniques and not necessarily a cutting operation. For example, a cutout may be formed using casting (as a mold feature), created through an additive manufacturing process, or established by several complementary pieces or parts that when brought together and attached form the cutout.

A first plurality of channels may be coupled to the mounting assembly 202 to circulate lubricating oil or other lubricant through the pair of turbochargers 205 and 207 mounted on the pedestals 262 and 264, respectively. By integrating the channels within the mounting assembly 202, structural integrity of the entire turbocharger assembly may be maintained. The lubricating oil channels 280 may include a first primary transverse channel 252, a second primary transverse channel 254, a first secondary transverse channel 242, and a second secondary transverse channel 244, each of the transverse channels extending along a latitudinal axis X-X' of the base. Each of the transverse channels may extend from the first face 261 to the second face 263 along the base. Each of the first primary transverse channel 252 and the second primary transverse channel 254 may include a curved first portion extending from the first face to the second face and a straight second portion extending downward along a longitudinal axis Y-Y'. Each of the first secondary transverse channel 242 and the second secondary transverse channel 244 may include a curved first section extending from the first face 261 to the second face 263 and a straight second portion extending towards each other along the latitudinal axis X-X'. That is, the second portion of the first secondary transverse channel 242 may extend towards the second portion of the second secondary transverse channel 244. The first secondary transverse channel 242 and the second secondary transverse channel 244 may merge to form a lubricant inlet 245. A diameter of the first primary transverse channel 252 may be equal to a diameter of the second primary transverse channel 254, while the diameter of the first secondary channel 242 may be equal to a diameter of the second secondary transverse channel 244. The diameter of each of the first primary transverse channel 252 and the second primary transverse channel may be larger than the diameter of each of the first secondary channel 242 and the second secondary transverse channel 244.

Figure 4:
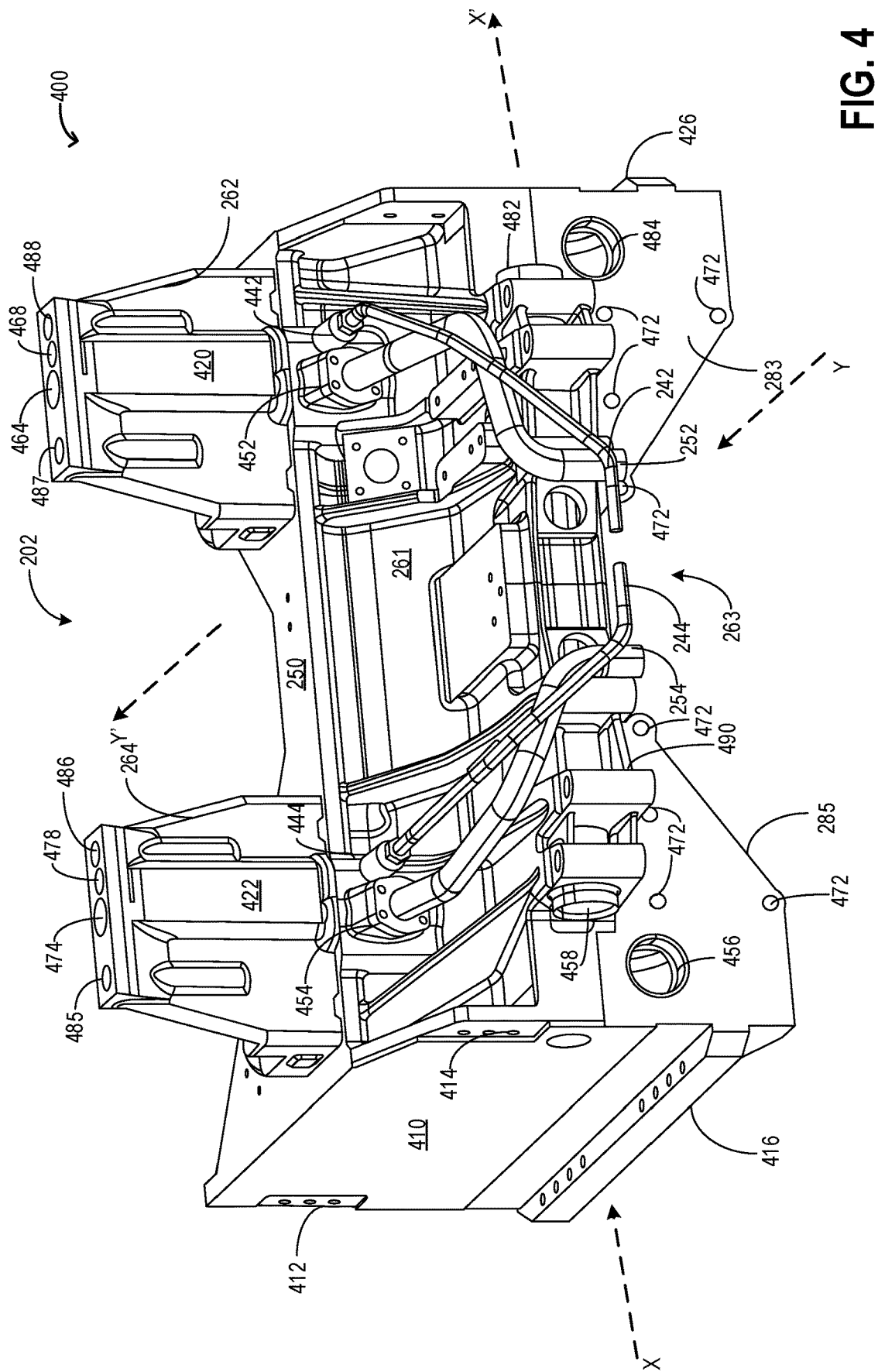
FIG. 4 shows a perspective back view of a turbocharger mounting assembly including lubricating channels.

As elaborated with reference to FIG. 4, the rectangular prism base may include a first pair of threaded openings coupled to the first and second transverse channel and projecting out of the rear surface, and a second pair of threaded openings coupled to the second transverse channel and projecting further out of the rear surface relative to the first pair of threaded openings, the second pair of threaded openings having a smaller diameter than the first pair of threaded openings. As elaborated with reference to FIG. 14, a second plurality of channels may be coupled to the mounting assembly 202 to circulate coolant such as cold water through the pair of CACs 210 and 220 mounted on each side of the mounting assembly 202.

Figure 3:
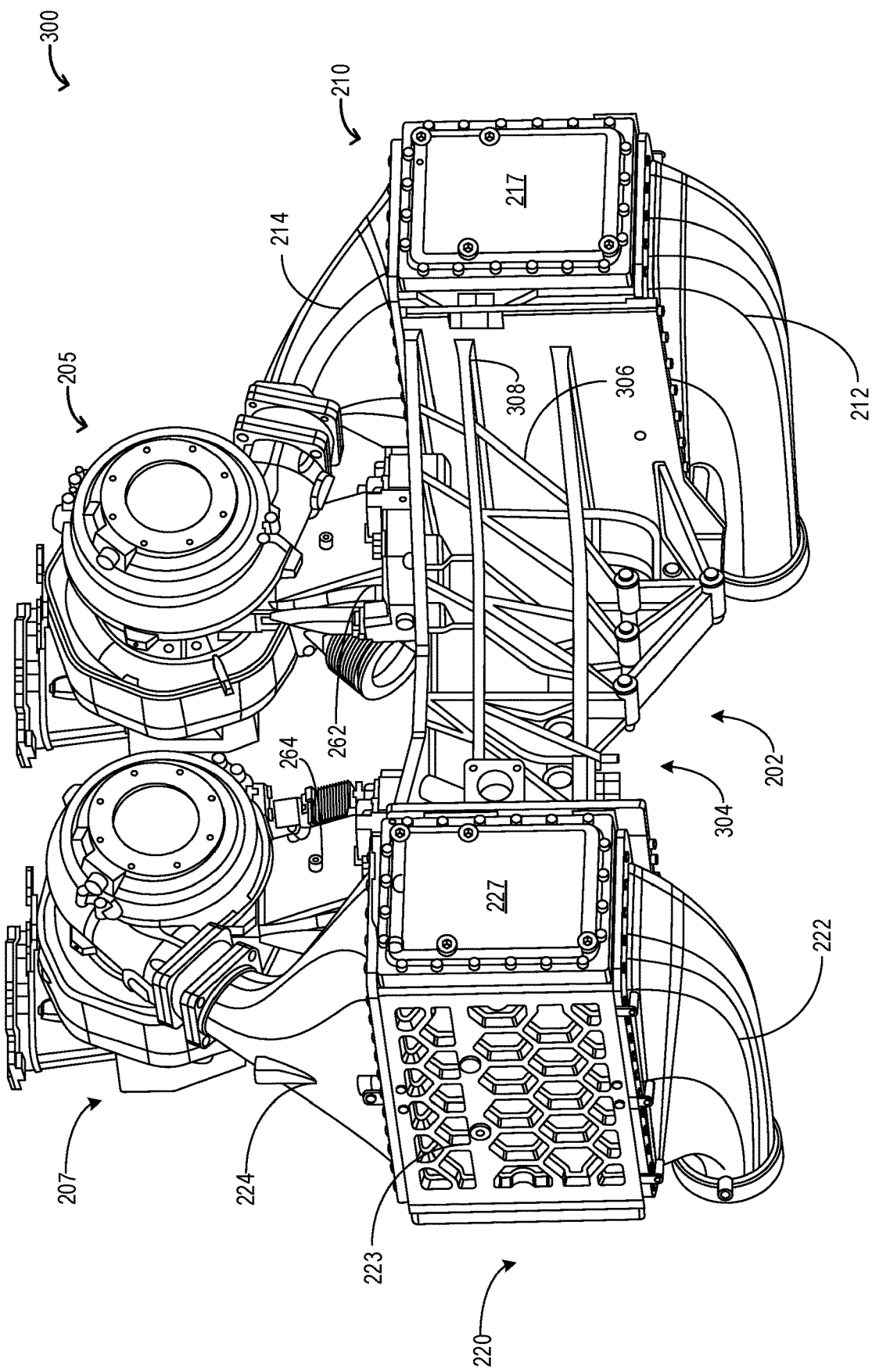
FIG. 3 shows a perspective view of the turbocharger mounting assembly of FIG. 2 with the pair of turbochargers and the pair of charge air coolers attached to the mounting assembly, when viewed from the front

FIG. 3 shows a perspective view 300 of the turbocharger mounting assembly 202 with the pair of turbochargers and the pair of charge air coolers attached to the mounting assembly, when viewed from the front. Components already introduced in FIG. 2 are numbered similarly and not re-introduced.

The front surface 304 of the mounting assembly 202 includes an arcuate cutout along one long side of the base for engaging with an intake manifold. The front surface may include a labyrinth of fins extending across the surface. A plurality of horizontal fins 308 and a plurality of tangential fins 306 constitute the labyrinth. The horizontal fins 308 and the tangential fins 306 may intersect forming a sturdy network. As an example, three horizontal fins 308 may contribute three tiers with the tangential fins connecting two consecutive tiers.

As discussed with relation to FIG. 2, two turbochargers 205 and 207 are mounted on respective pedestals 262 and 264 positioned on the top surface of the mounting assembly base. The pedestals 262 and 264 mounted on the one long side of the base may have an angled front surface facing the front surface 304 of the mounting assembly 202. Also, the pedestals 262 and 264 may taper from the top surface towards the bottom surface such that a width of each of the pedestals is larger at the bottom surface relative to the top surface. The broader base provides improved stability to the mounting structure supporting the turbochargers.

In the perspective view 300, a front surface 217 of the first charge air cooler (CAC) 210 is visible while a front surface 227 and a side surface 223 of the second CAC 220 are visible. The front surfaces 217 and 227 may be coplanar. A first inlet plenum 214 may couple a first turbocharger 205 to the first CAC 210 while a first outlet plenum 212 may couple the first CAC 210 to the intake manifold. A second inlet plenum 224 may couple a second turbocharger 207 to the second CAC 220 while a second outlet plenum 222 may couple the second CAC 220 to the intake manifold. The outlet plenums 222 and 212 may face towards the rear surface of the mounting assembly base.

FIG. 4 shows a perspective back view 400 of a turbocharger mounting assembly 202 including lubricating channels (without mounted turbochargers and charge air coolers). Components already introduced in previous figures are numbered similarly and not re-introduced.

The mounting assembly 202 may include a base (e.g., rectangular prism base) with two short surfaces on two ends, a top surface 250, a first face 261 of a rear surface and a second face 263 of the rear surface.

A side surface 410 includes a platform 416 projecting outward for engaging with a charge air cooler (CAC). A slot on the side of the CAC may be coupled to the platform 416 of mounting assembly base. Further the CAC may be secured via fasteners attached to the recesses 412 and 414 on the side surface 410. A first rectangular recess 412 including a plurality of holes to accommodate fasteners (such as bolts) may be formed on one edge of the side surface 410 while a second recess 414 including a plurality of holes to accommodate fasteners (such as bolts) may be formed on another, opposite, edge of the side surface 410. In this way, by engaging fasteners and/or via welding, a CAC may be securely mounted on a side of the mounting assembly base. A similar (symmetric) arrangement of platform 426 and recesses may be housed on the opposite side surface for engaging a second CAC.

A pair of pedestals may be mounted on a top surface 250 of the base 202 for supporting a pair of turbochargers. A first pedestal 262 may be positioned closer to a first side surface while the second pedestal 264 may be positioned closer to a second side surface 410 with a gap between the two pedestals. Each pedestal may comprise a broader base and a tapering top. The rear surface of each of the two pedestals may align with the first face 261 of the rear surface. The first pedestal 262 may include a first central portion 420 housing a pair of channels routing lubricating oil or other lubricant to and from the first turbocharger (not shown) mounted on the first pedestal 262. Similarly, the second pedestal 264 may also include a second central portion 422 housing a pair of channels routing lubricating oil or other lubricant to and from the second turbocharger (not shown) mounted on the second pedestal 264. The first central portion 420 may include a first central channel 464 running along a central longitudinal axis of the first pedestal 262 and a first side channel 468 running parallel to the first central channel 264 of the first pedestal 262 and positioned offset from the central longitudinal axis. The second central portion 422 may include a second central channel 474 running along a central longitudinal axis of the second pedestal 264 and a second side channel 478 running parallel to the second central channel 474 and positioned offset from the central longitudinal axis of the second pedestal 264. The diameter of each of the first central channel 464 and the second central channel 474 may be wider than the corresponding diameters of each of the first side channel 468 and the second side channel 278. A plurality of holes 485, 486, 487, and 488 may be drilled or otherwise formed in the pedestals 262 and 264 to accommodate fastening elements coupling the pedestals to the turbochargers.

The rectangular prism base may include a first pair of threaded openings projecting out of the first face 261 immediately below the first pedestal 262 (aligned with the first central portion 420), and a second pair of threaded openings projecting out of the first face 261 immediately below the second pedestal 264 (aligned with the second central portion 422). The first pair of threaded openings may include a first opening 452 and a second opening 442, while the second pair of threaded openings may include a third opening 454, and a fourth opening 444. The first opening 452 may be identical to the third opening 452 while the second opening 442 may be identical to the fourth opening 444. Each of the first opening 452 and the third opening 452 may have a larger diameter relative to a diameter of each of the second opening 442 and the fourth opening 444.

Each of the first central channel 464 and the second central channel 474 may be coupled on one (first) end at a top surface of a corresponding pedestal to a lubricating oil outlet of a corresponding turbocharger mounted on the corresponding pedestal, and each of the first side channel 468 and the second side channel 478 may be coupled on the one (first) end at the top surface to a lubricating oil inlet of the corresponding turbocharger. Another (second) end of the first central channel 464 may be aligned at a bottom surface to the first opening 452 while another (second) end of the second central channel 474 may be aligned at a bottom surface to the third opening 454. Also, another (second) end of the first side channel 468 may be aligned at a bottom surface to the second opening 442 while another (second) end of the second side channel 478 may be aligned at a bottom surface to the fourth opening 444.

The first primary transverse channel 252 may be fluidically coupled to the first central channel 464 via the first opening 452, the second primary transverse channel 254 may be fluidically coupled to the second central channel 474 via the third opening 454, the first secondary transverse channel 252 may be fluidically coupled to the first side channel 468 via the second opening 442, and the second secondary transverse channel 244 may be fluidically coupled to the second side channel 478 via the fourth opening 444.

Lubricating oil or other lubricant may flow to the two turbochargers mounted on each of the first pedestal 262 and the second pedestal 264 via the first secondary transverse channel 242 leading to the first side channel 488 and the second secondary traverse channel 244 leading to the second side channel 478, respectively. After circulating through the turbocharger, lubricant may flow out of the two turbochargers mounted on each of the first pedestal 262 and the second pedestal 264 via the first central channel 464 leading to the first secondary transverse channel 252 and the second central channel 474 leading to the second secondary traverse channel 254, respectively.

The second face 263 of the base may include a first trapezoidal projection 283 extending downward from the lower surface of the base and a second trapezoidal projection 285 extending downward from the lower surface of the base, the trapezoidal projections adjacent to the side surfaces of the base. A plurality of holes 472 may be present on the first trapezoidal projection 283 and the second trapezoidal projection 285. Fasteners may be engaged via these holes 472 to couple the base to the engine block.

The mounting assembly may include apertures to accommodate coolant lines carrying coolant or cold water to and from the CACs mounted on each side of the base. A first set of apertures may include a first circular aperture 484 positioned on the first trapezoidal projection 283 and a second circular aperture 456 positioned on the second trapezoidal projection 285. The first aperture 484 and the second aperture 456 may project in the Y-Y' direction. A second set of apertures may include a third aperture 482 and a fourth aperture 458 positioned at each end of a cylindrical bracket 490 attached to the second face 263 of the base, the cylindrical bracket 490 protruding outward (in the Y-Y' direction) from the base. The third aperture 482 and a fourth aperture 458 may project in the X-X' direction, the first set of apertures perpendicular to the second set of apertures.

FIG. 5 shows a back view 500 and FIG. 6 shows a front view 600 of the turbocharger mounting assembly 202 of FIG. 2 with a pair of turbochargers and a pair of charge air coolers (CAC) mounted on the mounting assembly 202 (also referred herein as base). Components already introduced in previous figures are numbered similarly and not re-introduced. The base 202 along with the pair of turbochargers and the CACs may be symmetric on each side of a central plane (denoted here by central axis A-A').

The first CAC 210 coupled to the right of the base may have a metal plate attached to the front surface 217 while the back surface 215 may house a plurality of openings for accommodating channels passing through the CAC 210. Similarly, the second CAC 220 coupled to the right of the base may have a metal plate attached to the front surface 227 while the back surface 225 may house a plurality of openings for accommodating channels passing through the CAC 220. Each of the first CAC 210 and the second CAC 220 may project outwards from the opposite, shorter, sides of the base. A first turbocharger may be mounted on the top, front side of the base via a first pedestal 262 positioned on the top, right surface of the base and a second turbocharger may be mounted on the top, front side of the base via a second pedestal 264 positioned on the top, left surface of the base.

A funnel shaped first turbine inlet 206 and a funnel shaped second turbine inlet 208 may be coupled to the rear side of the first turbocharger 205 and the rear side of the second turbocharger 207, respectively. A cylindrical first turbine outlet 209 and a cylindrical second turbine outlet 211 may be coupled to the rear side of the first turbocharger 205 and the rear side of the second turbocharger 207, respectively.

Exhaust may enter the first turbocharger 205 and the second turbocharger 207 via the first turbine inlet 206 and the second turbine inlet 208, respectively, and the exhaust may exit the first turbocharger 205 and the second turbocharger 207 via the first turbine outlet 209 and the second turbine outlet 211, respectively.

The first turbocharger 205 may be coupled to the first CAC 215 located below (along the same side of the base) via a first inlet plenum 214 positioned along the right side of the base. Similarly, the second turbocharger 207 may be coupled to the second CAC 225 located below (along the same side of the base) via a second inlet plenum 224 positioned along the left side of the base. A first outlet plenum 212 may be coupled to the lower surface of the first CAC 215 while a second outlet plenum 222 may be coupled to the lower surface of the second CAC 225. Each of the first outlet plenum 212 and the second outlet plenum 222 may point towards the rear side of the base 202.

The front surface 304 of the mounting assembly 202 may include a network of fins extending across the surface. A plurality of horizontal fins 308 and a plurality of tangential fins 306 may constitute a labyrinth. The lower part of the front surface may constitute a rectangular surface with a triangular cutout in the center. The rear surface 260 may include a rectilinear surface with a triangular cutout in the center. The triangular cutout in the center of the front surface may coincide with the triangular cutout in the center of the rear surface.

A plurality of channels are coupled to the rear 260 including a first primary transverse channel 252, a second primary transverse channel 254, a first secondary transverse channel 242, and a second secondary transverse channel 244. The first primary transverse channel 252 may include three sections, a first section coupled to the base may protrude out of the base followed by a second section extending latitudinally towards the second primary transverse channel 254 and a third section extending downward from the end of the second section. Similarly, second primary transverse channel 254 may include three sections, a first section coupled to the base may protrude out of the base followed by a second section extending latitudinally towards the first primary transverse channel 252 and a third section extending downward from the end of the second section. The first secondary transverse channel 242 may also include three sections, a first section coupled to the base may protrude out of the base followed by a second section extending diagonally downward towards the second secondary transverse channel 244 and a third section extending straight to the second secondary transverse channel 244. Similarly, the second secondary transverse channel 244 may also include three sections, a first section coupled to the base may protrude out of the base followed by a second section extending diagonally downward towards the first secondary transverse channel 242 and a third section extending straight to the first secondary transverse channel 242. The first secondary transverse channel 242 (third portion) and second secondary transverse channel 244 (third portion) may merge to form a lubricant inlet 245 positioned along the central axis A-A'.

Figure 8:
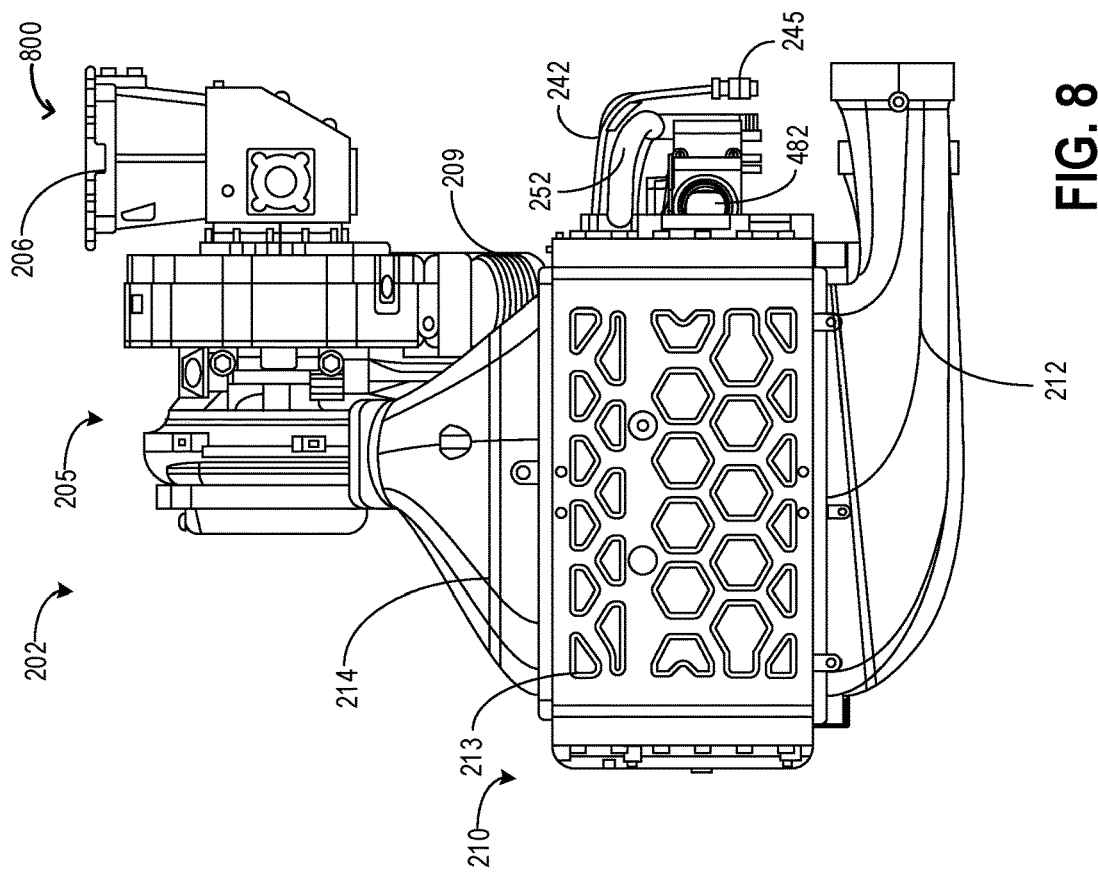
FIG. 8 shows a right view of the turbocharger mounting assembly of FIG. 2.
Figure 7:
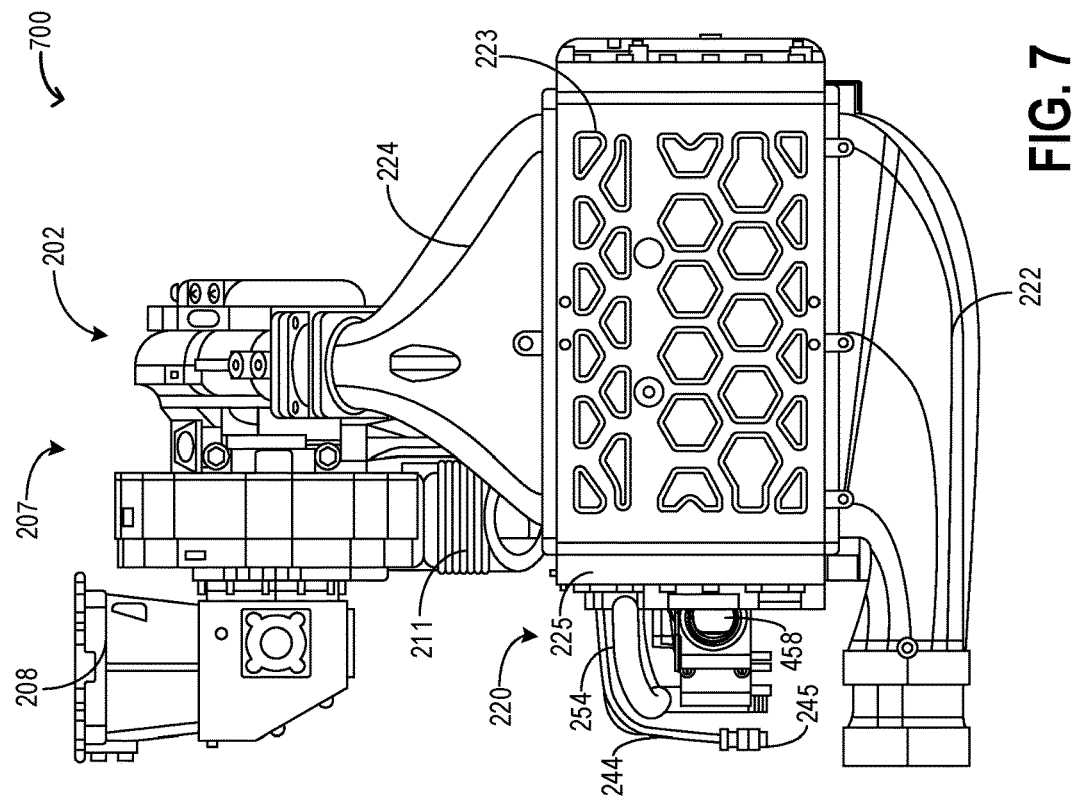
FIG. 7 shows a left view of the turbocharger mounting assembly of FIG. 2.

FIG. 7 shows a left view 700 and FIG. 8 shows a right view 800 of the turbocharger mounting assembly 202 of FIG. 2 with a pair of turbochargers and a pair of charge air coolers (CAC) mounted on the mounting assembly 202 (also referred herein as base). Components already introduced in previous figures are numbered similarly and not re-introduced.

The first CAC 210 coupled to the right of the base may have a rectangular metal plate attached to the right side surface 213, the metal plate including geometric patterns. Similarly, the second CAC 220 coupled to the right of the base may have a rectangular metal plate attached to the left side surface 223, the metal plate including geometric patterns. In one example, the geometric patterns on the metal plate may be windows for heat dissipation from the CACs. As the charge air is compressed, heat absorbed by the cold water flowing through the CAC may be dissipated outside the CAC via the cutouts on the sides.

A first turbocharger 205 may be mounted on the top, right surface of the base and a second turbocharger 207 may be mounted on the top, left surface of the base. Relative to the CACs, each corresponding turbocharger may be shifted towards the center of the base. A first turbine inlet 206 may be coupled to the upper, rear side of the first turbocharger 205 while a second turbine inlet 208 may be coupled to the rear side of the upper, second turbocharger 207. Each of the first turbine inlet 206 and the second turbine inlet 208 may have a broader mouth and a tapering lower side. A first turbine outlet 209 may be coupled to the lower, side of the first turbocharger 205, projecting towards the center of the base while a second turbine outlet 211 may be coupled to the lower side of the second turbocharger 207, projecting towards the center of the base.

A first inlet plenum 214 coupling the first turbocharger 205 to the first CAC 210 and a second inlet plenum 224 coupling the second turbocharger 207 to the second CAC 220 may be positioned on the top surfaces of the respective first CAC 210 and the second CAC 220. Each of the first inlet plenum 214 and the second inlet plenum 224 may project upwards and inwards (towards the center of the base), the inlet plenums having a broad first end adjoining the top surface of the corresponding CAC and a tapering second end adjoining the corresponding turbocharger. A first outlet plenum 212 coupling the first CAC 210 to the intake manifold and the second outlet plenum 222 coupling the second CAC 220 to the intake manifold may be positioned on the lower surfaces of the respective first CAC 210 and the second CAC 220. Each of the first outlet plenum 212 and the second outlet plenum 222 may project towards the rear of the base, the outlet plenums having a broad first end adjoining the lower surface of the corresponding CAC and a tapering second end leading to the intake manifold.

A plurality of channels including a first primary transverse channel 252, a second primary transverse channel 254, a first secondary transverse channel 242, and a second secondary transverse channel 244 may be coupled to the rear of the base for routing lubricant to and from the turbochargers. A cylindrical structure protruding outward from the rear of the base may include a pair of apertures 482 and 458 on each end.

Figure 10:
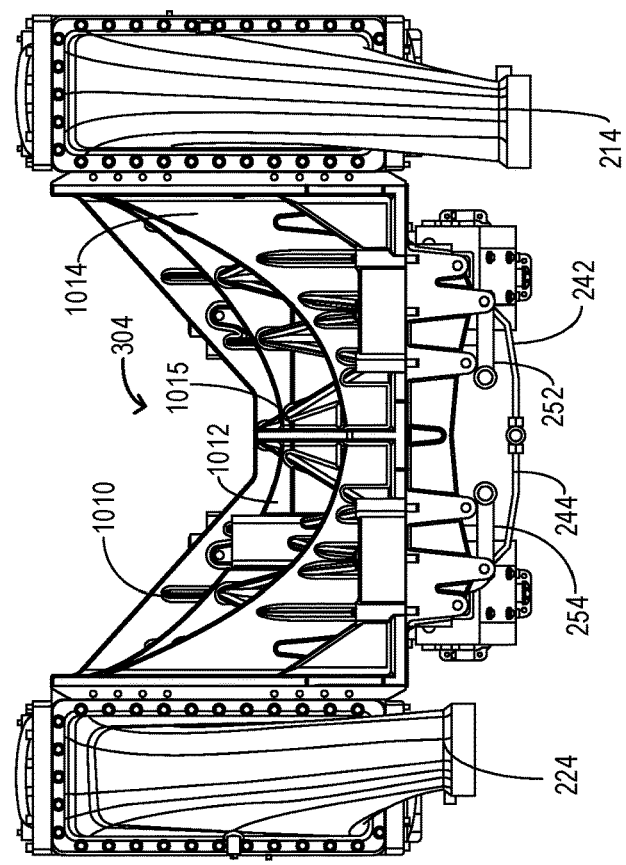
FIG. 10 shows a bottom view of the turbocharger mounting assembly of FIG. 2.
Figure 9:
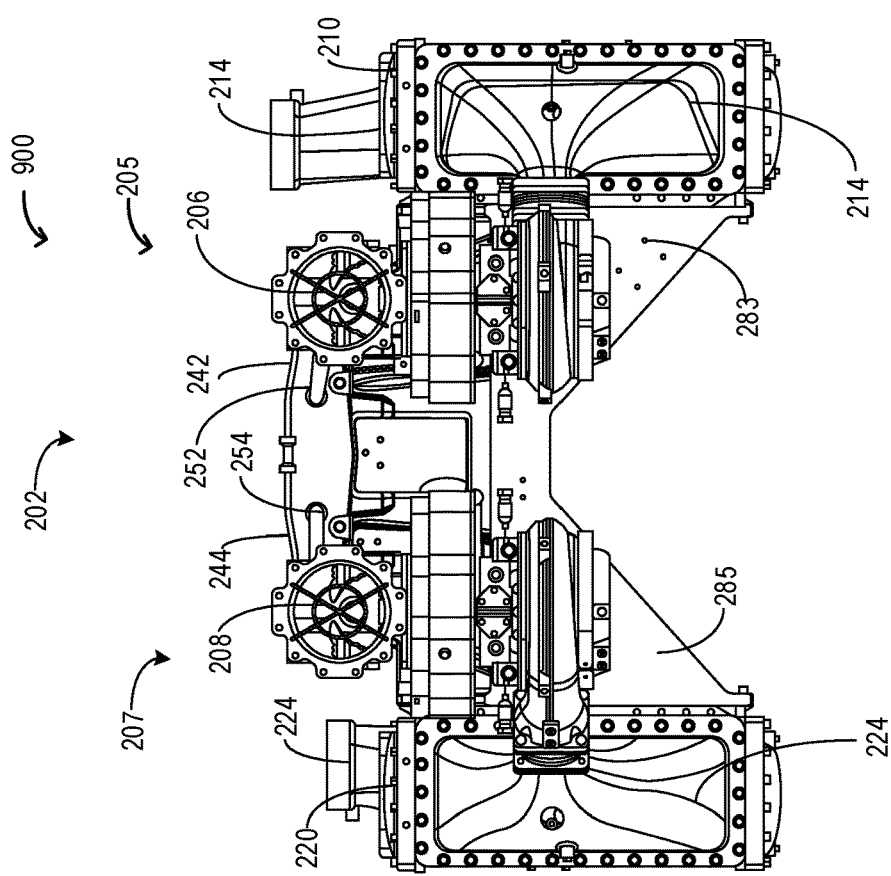
FIG. 9 shows a top view of the turbocharger mounting assembly of FIG. 2.

FIG. 9 shows a top view 900 and FIG. 10 shows a bottom view 1000 of the turbocharger mounting assembly 202 of FIG. 2 with a pair of turbochargers and a pair of charge air coolers (CAC) mounted on the mounting assembly 202 (also referred herein as base). Components already introduced in previous figures are numbered similarly and not re-introduced.

The base 202 may have a rectangular cross section with a trapezoidal cut out on a broader side of the rectangle in the rear surface. Due to the cutout, a first projection 283 may extend downward from the lower surface of the mounting assembly 202 and a second trapezoidal projection 285 may extend downward from the lower surface of the mounting assembly 202.

A pair of turbochargers 205, 207 may be positioned over the top surface of the base 202. A first turbine inlet 206 may be coupled to the upper, rear side of the first turbocharger 205 while a second turbine inlet 208 may be coupled to the rear side of the upper, second turbocharger 207. Each of the first turbine inlet 206 and the second turbine inlet 208 may have a circular cross section. A first inlet plenum 214 and a second inlet plenum 224 may protrude upwards from the charge air coolers (not shown) and fluidically couple the turbochargers with the corresponding CACs. A first outlet plenum 212 and a second outlet plenum 222 may project outwards towards the rear of the base.

A first primary transverse channel 252 and a second primary transverse channel 254 may project outward and downward from the rear surface of the base. While a first secondary transverse channel 242 may extend towards the center of the base and join with a second secondary transverse channel 244.

The front surface 304 of the mounting assembly 202 may include an arcuate cutout along a long side. The front surface may include three tiers 1010, 1012, and 1014 with a labyrinth of fins extending between two consecutive tiers. Each tier may be arcuate with a central pillar 1015 coupling the three tiers. The tiered structure along with the central pillar 1015 and the plurality of fins provide structural integrity and strength to the mounting assembly 202.

Figure 11:
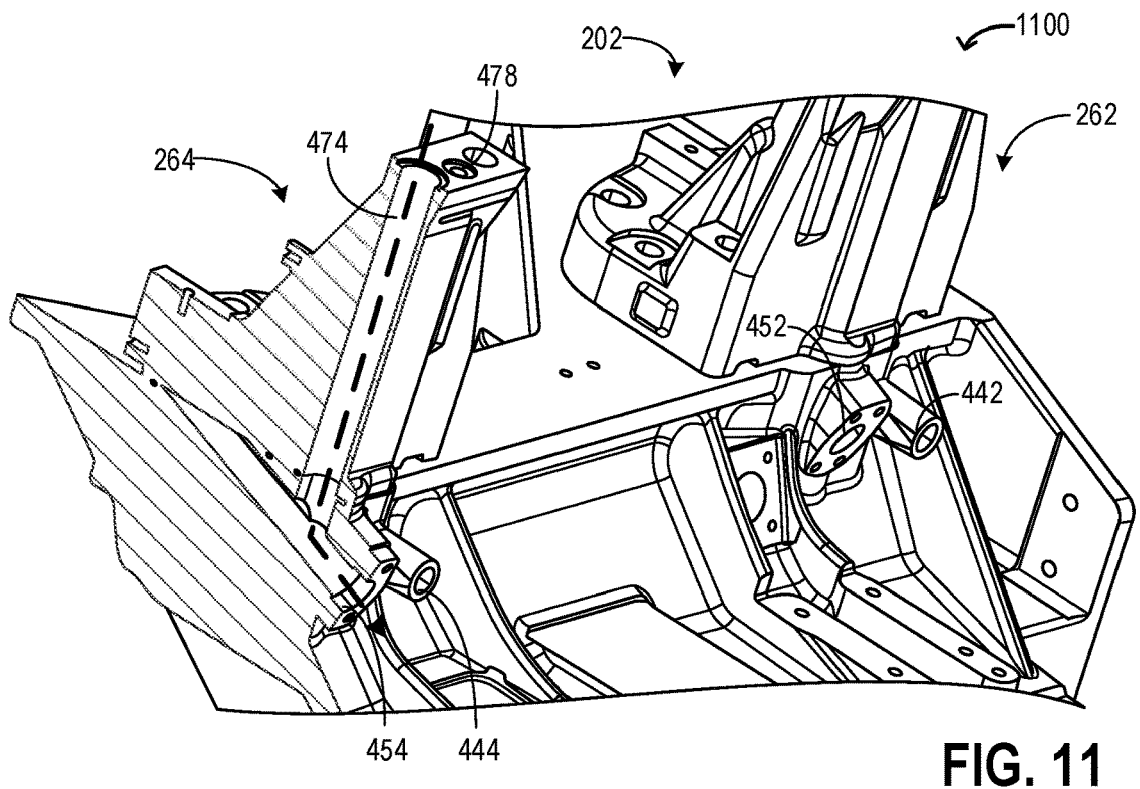
FIG. 11 shows a first cross sectional view of a pedestal in the turbocharger mounting assembly of FIG. 2.
Figure 12:
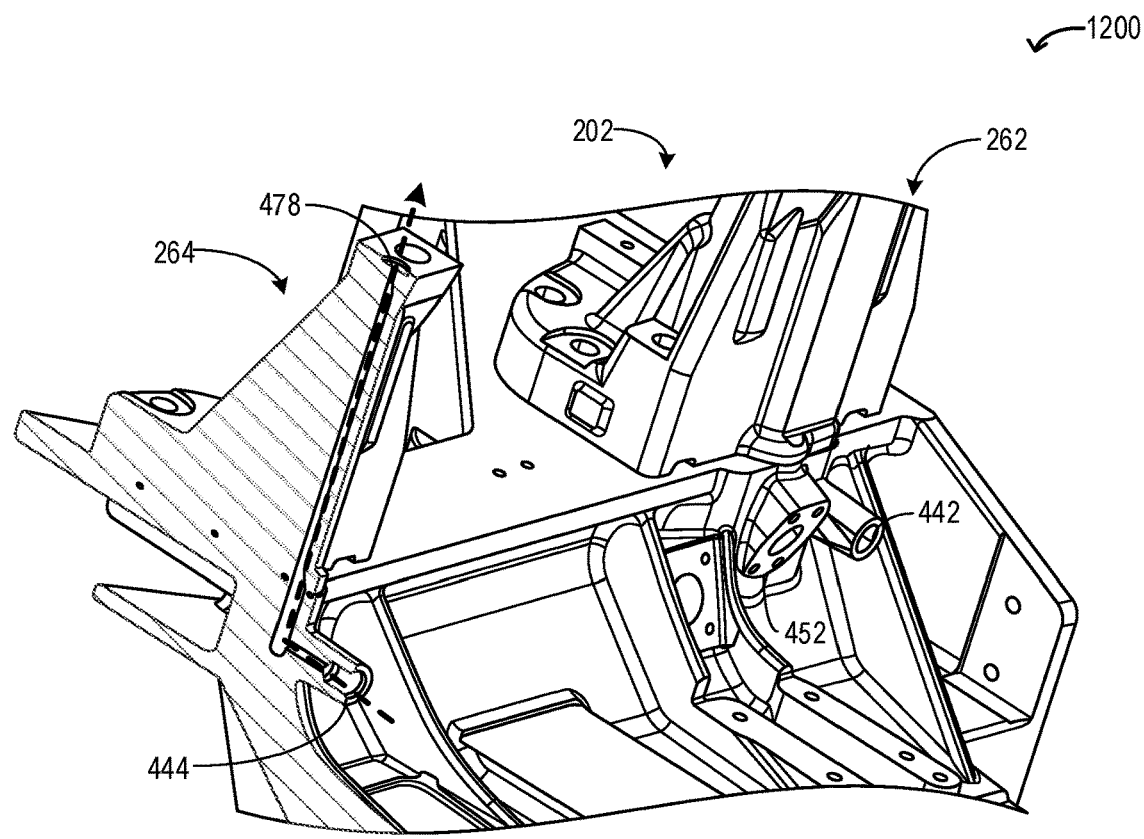
FIG. 12 shows a second cross sectional view of a pedestal of FIG. 11.

FIG. 11 shows a first cross sectional view 1100 of a pedestal 264 in the turbocharger mounting assembly 202 of FIG. 2. FIG. 12 shows a second cross sectional view 1200 of the pedestal 264 in the turbocharger mounting assembly 202 of FIG. 2. In the first cross sectional view 1100, the cross-section is drawn across a second central channel 474 housed in the pedestal 264, while in the second cross sectional view 1200, the cross-section is drawn across a second side channel 478 housed in the pedestal 264. Components already introduced in previous figures are numbered similarly and not re-introduced.

The second central channel 474 may run along a central longitudinal axis of the second pedestal 264 and a second side channel 478 may run parallel to the second central channel 274 of the second pedestal 264 and positioned offset (to the right) from the central longitudinal axis. The diameter of the second central channel 474 may be bigger than the diameter of the second side channel 478. The second central channel 474 may extend from the top surface of the pedestal 264 to a third opening 454, while second side channel 468 may extend from the top surface of the pedestal 264 to a fourth opening 444.

Lubricating oil (or other lubricant) may enter the second turbocharger via the fourth opening 444 and the second side channel 478. The fourth opening may be fluidically coupled to an oil sump via an oil circulation line from which the oil may be pumped to the first turbocharger via the second side channel 478. After circulating through the first turbocharger, the lubricating oil may return to the sump via the second central channel 464 and the third opening 454, the third opening 454 fluidically coupled to the sump via an oil return line. Similarly, lubricating oil may be supplied to the first turbocharger via the second opening 442 and the first central channel (not shown) and after circulating through the first turbocharger, the oil may return to the sump via the first side channel (not shown) and the first opening 452. By incorporating oil channels within the pedestals supporting the turbochargers, oil transport efficiency may be improved and requirement for additional oil channels may be reduced.

Figure 13:
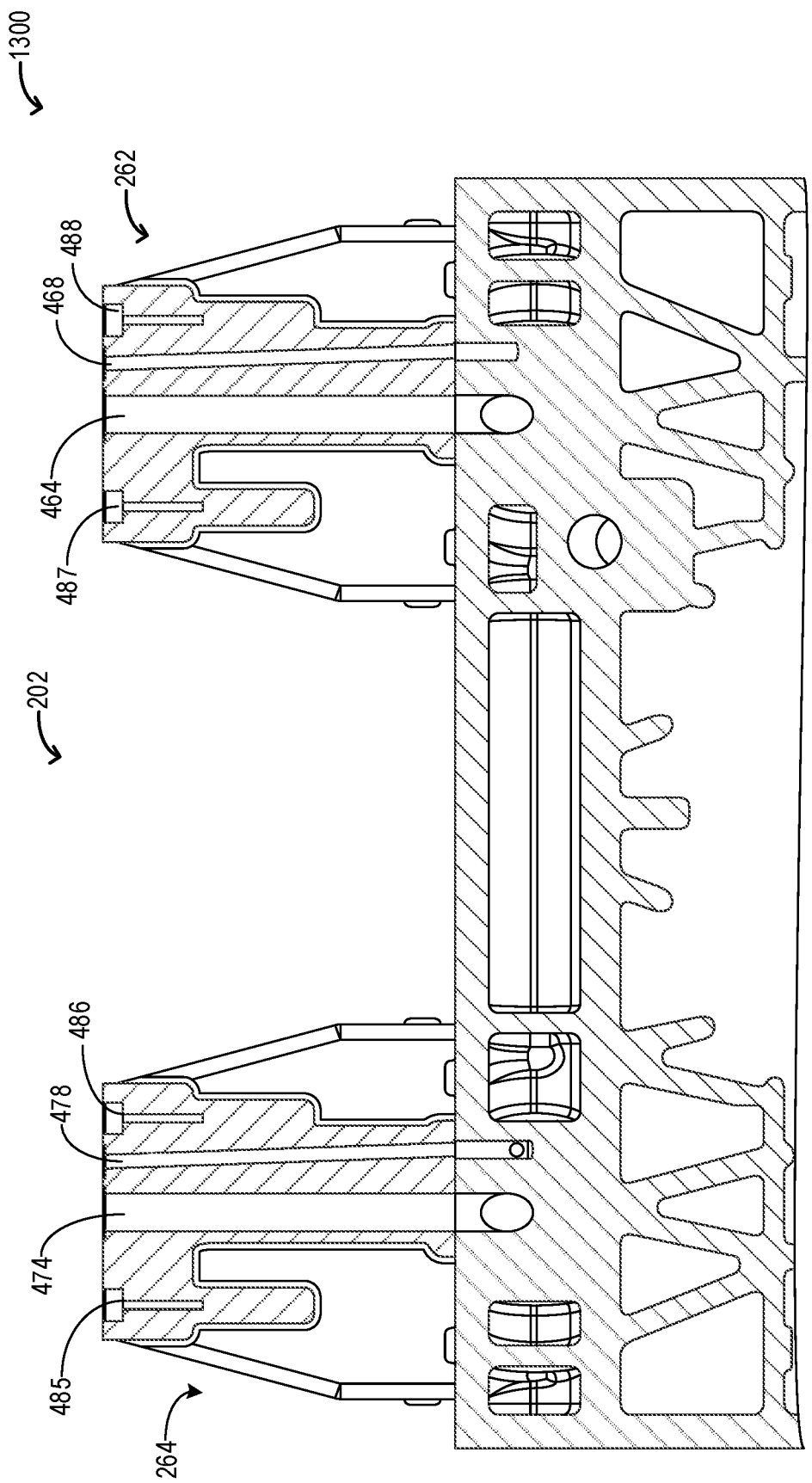
FIG. 13 shows a cross sectional view of the turbocharger mounting assembly of FIG. 2 including two pedestals.

FIG. 13 shows a cross sectional view 1300 of the turbocharger mounting assembly 202 of FIG. 2 including two pedestals. Components already introduced in previous figures are numbered similarly and not re-introduced. Two separate turbochargers may be mounted to the two pedestals.

The mounting assembly 202 may have a rectangular cross section while each of the first pedestal 262 and the second pedestal 264 may have a rectangular base with a tapering upper portion. The width of the base of each of first pedestal 262 and the second pedestal 264 may be bigger than the width of the top portion of the respective pedestal.

A first central channel 464 may be housed within the central portion of the first pedestal 262 while a first side channel 468 may be housed with the first pedestal 262 parallel to the first central channel 464 and offset to one side. Similarly, a second central channel 474 may be housed within the central portion of the second pedestal 264 while a second side channel 478 may be housed with the second pedestal 264 parallel to the second central channel 474 and offset to one side. Each of the first central channel 464, the second central channel 474, the first side channel 468 and the second side channel 278 may be of uniform cross section and may be parallel to each other. The first central channel 464 and the second central channel 474 may be wider than the corresponding diameters of each of the first side channel 468 and the second side channel 278.

A pair of holes 487 and 488 may be housed in the first pedestal 262 on a left side of the first central channel 464 and a right side of the first side channel 468, respectively. Similarly, a pair of holes 485 and 486 may be housed in the second pedestal 264 on a left side of the second central channel 474 and a right side of the second side channel 478, respectively. The holes 485, 486, 487, and 488 may be drilled or otherwise formed in the pedestal blocks proximal to the side edges of the respective pedestals, and the turbochargers may be coupled to the respective pedestals via fasteners passing through the holes.

Figure 14:
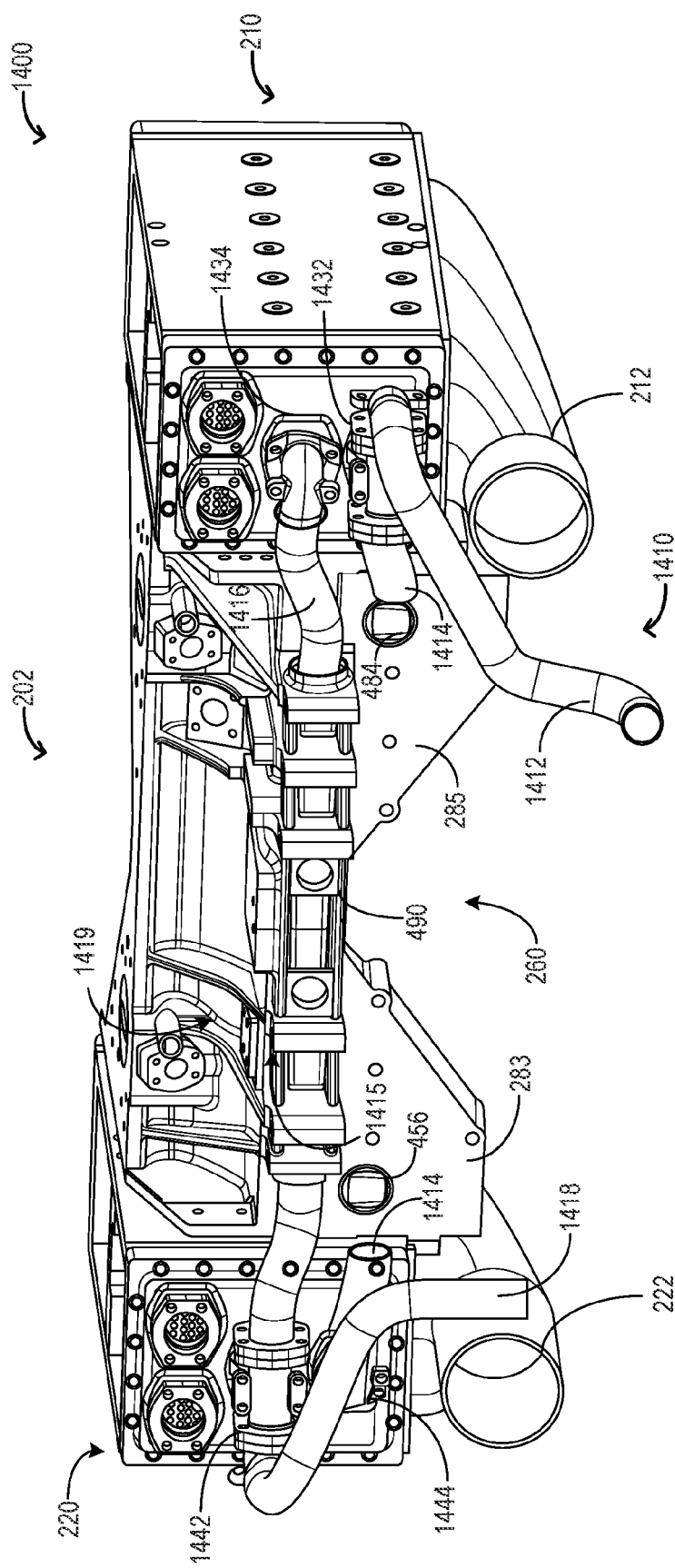
FIG. 14 shows a perspective back view of a turbocharger mounting assembly including coolant lines.

FIG. 14 shows a perspective back view 1400 of the turbocharger mounting assembly 202 (also referred herein as base) including coolant lines 1410. Components already introduced in previous figures are numbered similarly and not re-introduced. Coolant such as cold water may be circulated through each of the first CAC 210 and the second CAC 220 via the coolant lines 1420.

A cylindrical bracket 490, extending along a long side of the rectangular base, may project out of the rear surface of the base. The cylindrical bracket 490 may enclose an opening or tunnel for the coolant lines to pass from one side of the base to another. Also, a first circular aperture 484 positioned on the first trapezoidal projection 283 and a second circular aperture 456 positioned on the second trapezoidal projection 285 may provide openings for the coolant lines to pass. A first bracket 1432 may be coupled to the rear surface of the first CAC 210 to support a coolant line passing through the first CAC 210 while a second bracket 1442 may be coupled to the rear surface of the second CAC 220 to support a coolant line passing through the second CAC 220. Each of the first bracket 1432 and the second bracket 1442 may include two loops to support the coolant line passing through them. A plurality of openings on the rear surface of each of the first CAC 210 and the second CAC 220 may provide pathways for the coolant lines to enter or exit the CACs.

A coolant inlet channel 1412 may bifurcate with a first coolant inlet branch (not shown) entering the first CAC 210 while a second coolant inlet branch 1414 passing through the first bracket 1432 and then extending to the second CAC 220 via the first circular aperture 484 positioned on the first trapezoidal projection 283 and the second circular aperture 456 positioned on the second trapezoidal projection 285. The second coolant inlet branch 1414 may then enter the second CAC 220 via an opening 1444 on the rear surface of the second CAC 220.

A first coolant outlet branch 1416 may originate from an opening 1434 on the rear surface of the first CAC 210 and extend towards the second CAC 220 while passing through the opening enclosed within the cylindrical bracket 490 and the second bracket 1442. A second coolant outlet branch (not shown) may originate from an opening on the rear surface of the second CAC 220 and merge with the first coolant outlet branch 1416 to form the coolant outlet channel 1418 leading to a coolant sump.

Figure 15:
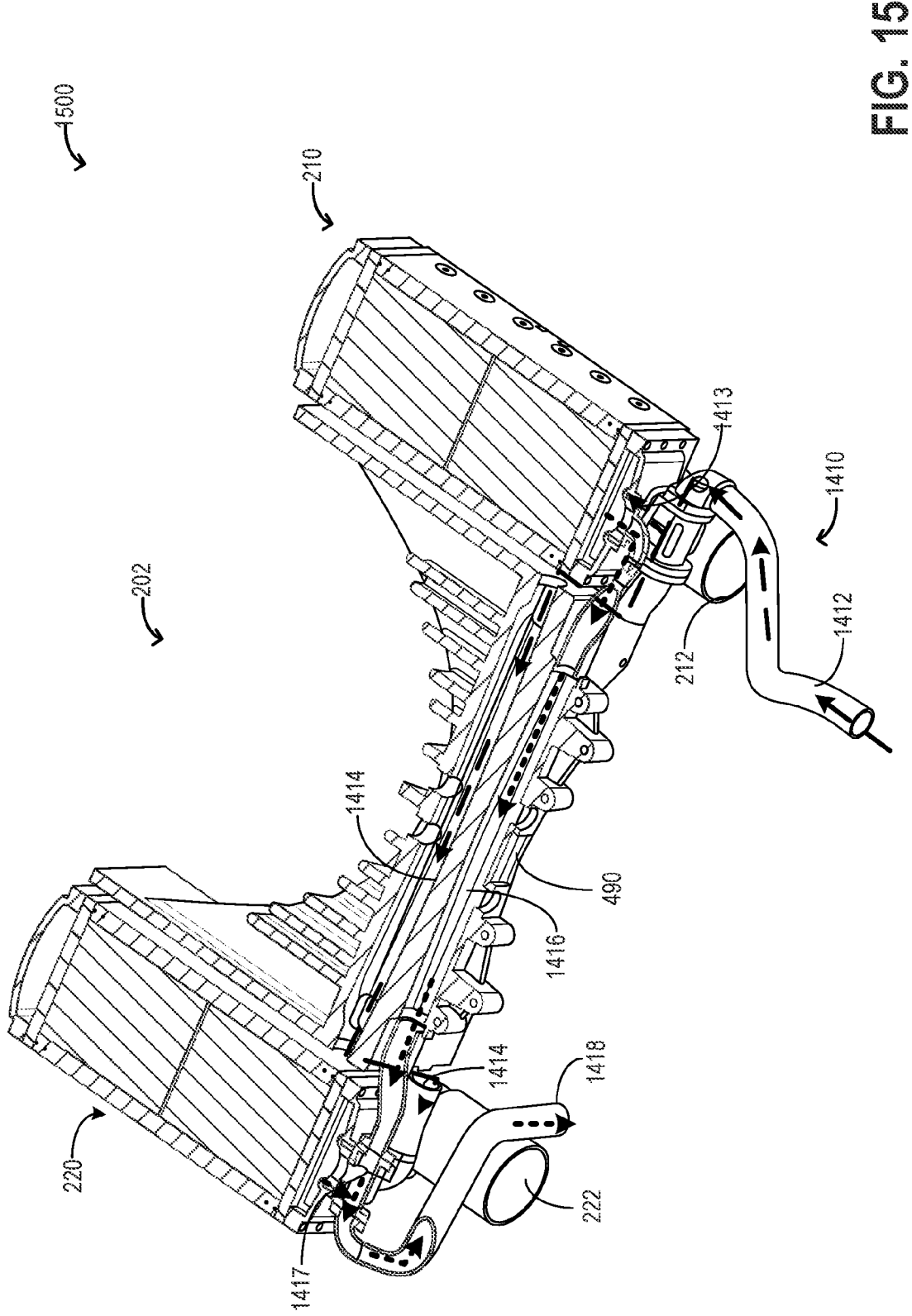
FIG. 15 shows a perspective top view of a turbocharger mounting assembly including the coolant lines.

FIG. 15 shows a perspective top view 1500 of a turbocharger mounting assembly 202 of FIG. 2 including the coolant lines as introduced in FIG. 14. A direction of coolant flow through the coolant lines 1410 is shown. Components already introduced in previous figures are numbered similarly and not re-introduced. Cross-sectional view of some coolant channels are shown for depicting a direction of coolant flow through the respective channels.

As shown by broad dashed arrows, coolant from a sump may enter the coolant lines 1410 supplying coolant to the charge air coolers (CACs) 210 and 220 via a coolant inlet channel 1412. The coolant flow may then bifurcate with a first portion of the total amount of coolant entering the first CAC 210 via a first coolant inlet branch 1413 and a second, remaining, portion of the coolant flowing to the second CAC via the second inlet branch 1414. After circulating through the first CAC 210, shown by narrow dashed arrows, the coolant may exit the first CAC 210 via the first coolant outlet branch 1416. After circulating through the second CAC 220, shown by narrow dashed arrows, the coolant may exit the second CAC 220 via the second coolant outlet branch 1417. Coolant flowing through each of the first coolant outlet branch 1416 and the second coolant outlet branch 1417 may merge and return to the sump via the coolant outlet channel 1418. In one example, the coolant flowing through the CACs may be cold water.

Figure 17:
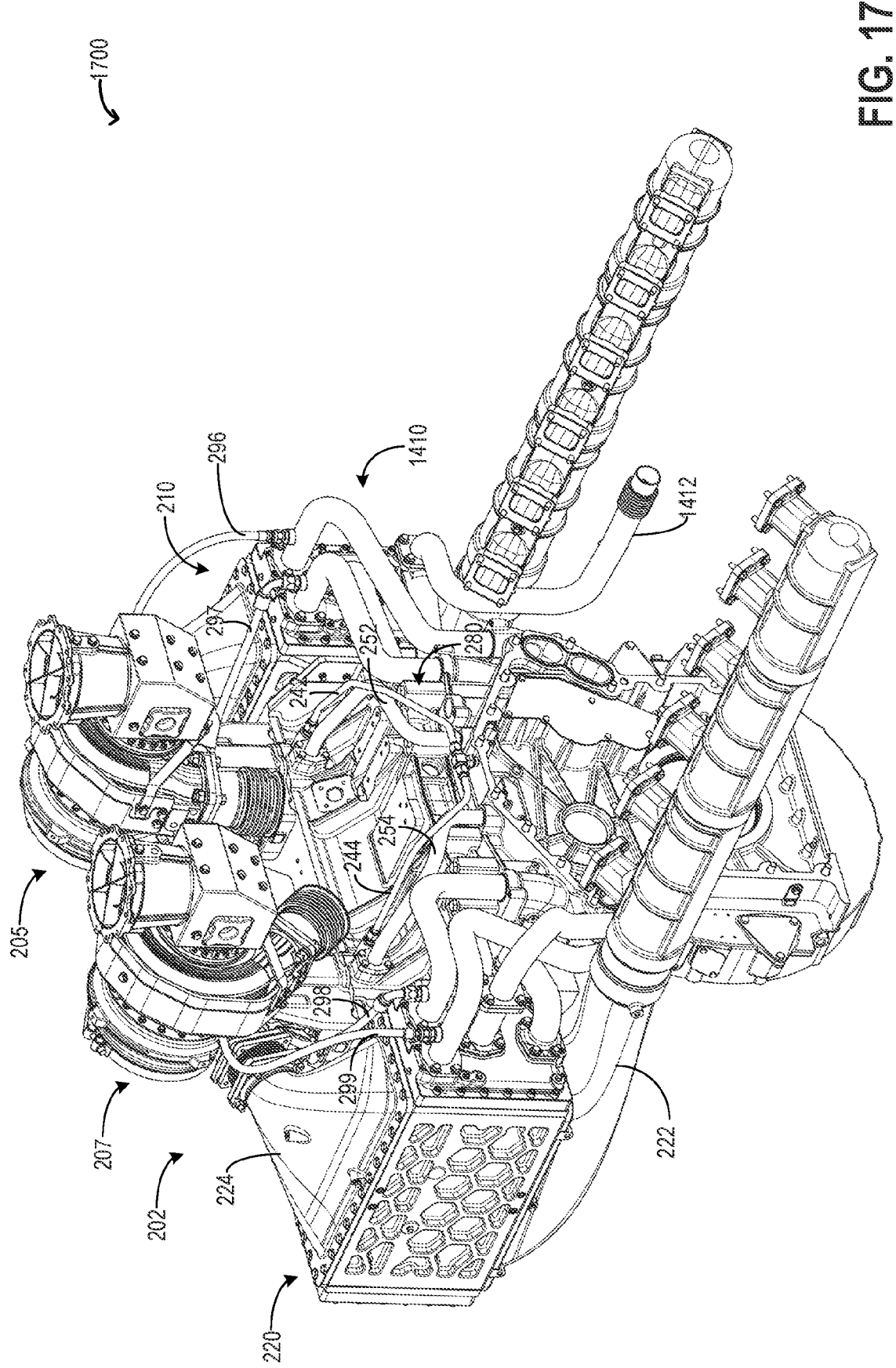
FIG. 17 shows an engine system including the turbocharger mounting assembly of FIG. 2.

The second inlet branch 1414 and the first coolant outlet branch 1416 may run parallel to each other, along a wide side of the base with the second inlet branch 1414 passing through a cavity formed in the base directly behind the cylindrical bracket 490 housing the first coolant outlet branch 1416. Each of the first coolant inlet branch 1413 and the second inlet branch 1414 may be cylindrical tubes entering the first CAC 210 and the second CAC 220, respectively, via openings on the rear surfaces of the respective CACs. Similarly, each of the first coolant outlet branch 1416 and the second coolant outlet branch 1417 may be cylindrical tubes exiting the first CAC 210 and the second CAC 220, respectively, via openings on the rear surface of the respective CACs. In this way, the base 202 may provide support to coolant lines circulating coolant through the CACs, thereby improving coolant transport efficiency. In addition to the coolant lines shown here, there may be additional coolant lines for higher temperature coolant and lower temperature coolant and also for supplying coolant to turbochargers coupled to the CACs. FIG. 17 shows an example coolant system with lower temperature coolant lines and higher temperature coolant lines.

Figure 16:
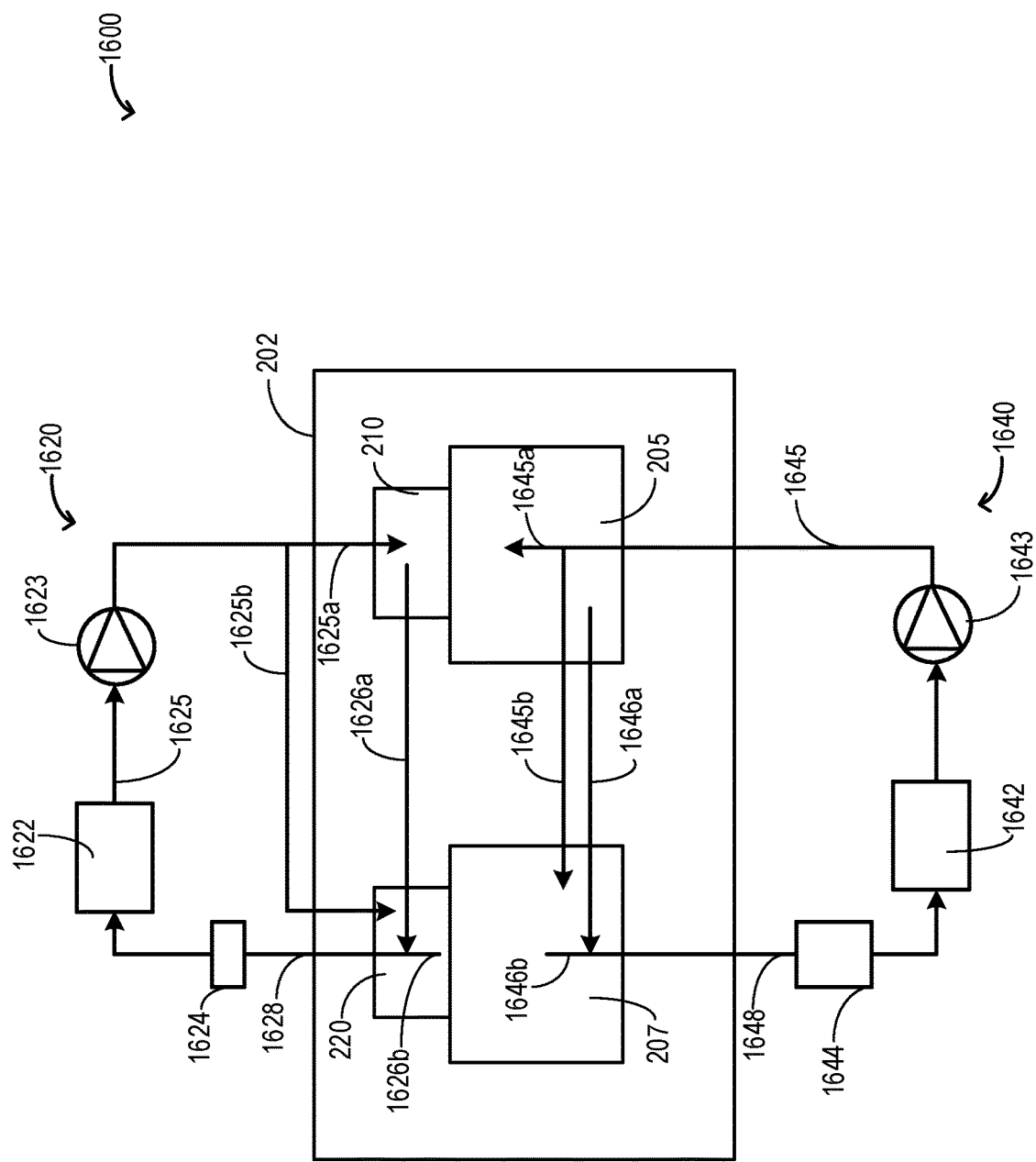
FIG. 16 shows an example lubricant (e.g., lubricating oil) circuit supplying oil or other lubricant to the turbochargers and an engine coolant circuit supplying coolant to the charge air coolers.

FIG. 16 shows a schematic arrangement/loop 1600 of a lubricant (e.g., lubricating oil) circuit 1640 supplying oil or other lubricant to turbochargers and an engine coolant circuit 1620 supplying coolant to charge air coolers (CACs)

coupled to the turbochargers. Components already introduced in previous figures are numbered similarly and not re-introduced.

A first turbocharger 205 and a second turbocharger 207 may be coupled to a mounting assembly 202. A first CAC 210 may be coupled to the first turbocharger 205 and a second CAC 220 may be coupled to the second turbocharger 207. Lubricating oil may be circulated through the turbochargers to reduce friction and improve efficiency via the lubricating oil circuit 1640 while a coolant such as water may be supplied to the CACs via the engine coolant circuit 1620 to cool the compressed charge air exiting the compressors (of the turbochargers) in order to improve air density and combustion.

The lubricating oil circuit 1640 may include an oil sump 1642 storing the lubricating oil, an oil pump 1643 flowing oil through the circuit 1640, and a heat exchanger 1644 dissipating heat from the oil. An oil intake channel 1645 may originate from the oil sump 1642 and then bifurcate into a first oil inlet 1645a entering the first turbocharger 205 and a second oil inlet 1645b entering the second turbocharger 207. The oil pump may be coupled to the oil intake channel 1645 and the oil pump 1643 may be operated to draw the oil from the sump 1642 and then route the oil to each of the first turbocharger 205 and the second turbocharger 207 via the first oil inlet 1645a and the second oil inlet 1645b, respectively. After circulating through the first turbocharger 205, the lubricating oil may be routed out of the first turbocharger 205 via a first oil outlet 1646a while after circulating through the second turbocharger 207, the lubricating oil may be routed out of the second turbocharger 207 via a second oil outlet 1646b. The first oil outlet 1646a may merge with the second oil outlet 1646b and lead to an oil outlet channel 1648 fluidically coupled to the sump via the heat exchanger 1644. At the heat exchanger 1644, heat captured by the lubricating oil while circulating through the turbochargers may be dissipated prior to the return of the oil to the sump 1642.

The coolant circuit 1620 may include a coolant sump 1622 storing coolant such as cold water, a pump 1623 flowing coolant through the circuit 1620, and a radiator 1624 dissipating heat from the coolant to the atmosphere. A coolant intake channel 1625 may originate from the coolant sump 1622 and then bifurcate into a first coolant inlet 16425a entering the CAC 210 and a second coolant inlet 1625b entering the second CAC 220. The pump 1623 may be coupled to the coolant intake channel 1625 and the pump 1623 may be operated to draw the coolant from the sump 1622 and then route the coolant to each of the first CAC 210 and the second CAC 220 via the first coolant inlet 1625a and the second coolant inlet 1625b, respectively. After circulating through the first CAC 210, the coolant may be routed out of the first CAC 210 via a first coolant outlet 1626a while after circulating through the second CAC 220, the coolant may be routed out of the second CAC 220 via a second coolant outlet 1626b. The first coolant outlet 1626a may merge with the second coolant outlet 1626b and lead to a coolant outlet channel 1628 fluidically coupled to the sump via the radiator 1624. At the radiator 1624, heat captured by the coolant while circulating through the CACs may be dissipated prior to the return of the coolant to the sump 1622.

FIG. 17 shows a perspective view 1700 of the turbocharger mounting assembly 202 with the pair of turbochargers, the pair of charge air coolers attached to the mounting assembly, lubricant lines, and coolant lines. Components already introduced in previous figures are numbered similarly and not re-introduced.

A rectangular base 202 (also referred herein as mounting assembly) may include a first set of oil channels 280 (i.e., channels for carrying oil or other lubricant) extending forwards\along a longitudinal axis from a sloping, first face of a rear surface of the base towards a rectilinear, second face of the rear surface. A pair of pedestals may be mounted on a top surface of the base 202, a rear surface of the pair of pedestals aligned with the rear surface of the base, a bottom surface of the pair of pedestals resting on a top surface of the base. The pair of pedestals may include a second set of oil channels in fluid communication with the first set of oil channels (not shown) of the base 202. A first turbocharger 205 may be mounted on a first pedestal while a second turbocharger 207 may be mounted on a second pedestal.

In one example, the second set of oil channels may include a first primary channel aligned with a central axis of the first pedestal, a second primary channel aligned with a central axis of the second pedestal, a first secondary oil channel running through the first pedestal, and a second secondary oil channel running through the second pedestal. Each of the first secondary oil channel and the second secondary oil channel may be offset from the central axis and parallel to the respective primary channels. Lubricating oil may be transported through the secondary channels to an oil inlet of a corresponding turbocharger mounted on the corresponding pedestal and lubricating oil may be transported through the primary channels from an oil outlet of a corresponding turbocharger.

The first set of oil channels 280 includes a third primary channel 252 and a fourth primary channel 254 that extends from the rear surface of the base into the first primary oil channel and the second primary oil channel of the second set of channels. Each of the first, second, third, and fourth the primary oil channel may have having a common diameter. The first set of oil channels 280 also includes a third secondary channel 242 and a fourth secondary channel 254 that extends from the rear surface of the base into the first secondary oil channel and the second secondary oil channel of the second set of channels. Each of the first, second, third, and fourth the secondary oil channels may have having a same diameter. Lubricating oil received in the secondary oil channels from a lubricating oil reservoir of the lubricating oil circuit is transported to the turbochargers. The rear surface of the base may include a pair of first projections extending rearwards from the first primary channel and the second primary channel, and a pair of second projections extending rearwards from the first secondary channel and the second secondary channel, the first projections wider than the second projections, the second projections extending rearwards by a larger amount than the first projections. In this way, the lubricating oil circuit may be in fluidic communication with the turbochargers via each of the first and second set of oil channels.

A pair of projections may extend from first and second side surfaces of the base with pair of charge air coolers 210, 220 correspondingly mounted on the pair of projections. A first plenum may connect the first turbocharger 205 to the first charge air cooler 210 and a second plenum 224 may connect a second turbocharger 207 to the second charge air cooler 220.

A first set of coolant channels 1410 may extend along a latitudinal axis, perpendicular to the longitudinal axis, from the first side surface to the second side surface of the base. The charge air coolers 210, 220 may include a second set of coolant channels in fluid communication with the first set of coolant channels 1410 of the base. The first set of channels

1410 may include, a first coolant channel in fluidic communication with an inlet of the first charge air cooler, a second coolant channel in fluidic communication with an inlet of the second charge air cooler, a third coolant channel in fluidic communication with an outlet of the first charge air cooler, and a fourth channel in fluidic communication with each of an outlet of the second charge air cooler and the third coolant channel. The first and the second coolant channels may originate from a main coolant inlet line 1412 coupled to a coolant system while the third and the fourth channels may merge to form a main coolant outlet line. The second coolant channel may extend from the first side surface to the second side surface via a cavity formed in the base and the third coolant channel may extend from the first side surface to the second side surface passing through a cylindrical bracket attached to the base, the second coolant channel rearward relative to the third coolant channel. A pair of inlet auxiliary coolant channels 296, 298 may deliver coolant drawn from the coolant channels into coolant inlets of the respective turbochargers 205, 207, coupled to the charge air coolers 210, 220. A pair of outlet auxiliary coolant channels 297, 299 may draw coolant from the coolant outlets of the respective turbochargers 205, 207, and route the coolant to the main coolant outlet line. In this way, a coolant system may be in fluidic communication with the charge air coolers via each of the first and second set of coolant channels.

FIGS. 2-17 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

An example cooling system comprises: a rectangular prism base with an arcuate cutout along one long side of the base for engaging with an intake manifold, the rectangular base including a platform projecting out from each short side of the base for engaging with a charge air cooler, and a first and a second pedestal positioned on a top surface of the base, each of the first and second pedestal having a tapered front surface facing the arcuate cutout on the one long side of the base and a rectilinear back surface aligned with another long side of the base, the first pedestal supporting a first turbocharger mounted thereon, the second pedestal supporting a second turbocharger mounted thereon, wherein each of the first and second pedestal further includes at least two channels running through a pedestal body, the at least two channels coupled to corresponding channels extending through the rectangular prism base. In any or all of the preceding examples, additionally or optionally, a first of the pair of pedestals is positioned towards one short side of the base while a second of the pair of pedestals is positioned towards another short side of the base, the pair of pedestals aligned on either side of the arcuate cutout. In any or all of the preceding examples, additionally or optionally, the two channels running through the pedestal body of each of the first and second pedestal include a first central channel running along a central longitudinal axis and a second side channel running parallel to the first channel and positioned offset from the central longitudinal axis of each of the first and second pedestal. In any or all of the preceding examples, additionally or optionally, the first channel has a larger diameter than the second channel. In any or all of the preceding examples, additionally or optionally, the first channel is coupled on one end at a top surface of a corresponding pedestal to a lubricating oil outlet of a corresponding turbocharger mounted on the corresponding pedestal, and wherein the second channel is coupled on the one end at the top surface to a lubricating oil inlet of the corresponding turbocharger. In any or all of the preceding examples, additionally or optionally, the corresponding channels extending through the rectangular prism base include a first and second primary transverse channel and a third and fourth secondary transverse channel, each of the first, second, third, and fourth transverse channels extending along a latitudinal axis of the base from a first face of a rear surface of the base along the another long side towards a second face of the rear surface of the base along the one long side, each of the first, second, third, and fourth transverse channels perpendicular to each of the first and second channels of the first and seconds pedestals. In any or all of the preceding examples, additionally or optionally, the rectangular prism base further includes a first pair of threaded openings coupled to the first and second primary transverse channels and projecting out of the first face of the rear surface, and a second pair of threaded openings coupled to the third and fourth secondary transverse channels and projecting further out of the first face of the rear surface relative to the first pair of threaded openings, the second pair of threaded openings having a smaller diameter than the first pair of threaded openings. In any or all of the preceding examples, additionally or optionally, the first and second pedestals are positioned on the base such that another end of the first channel of the first and second pedestals are aligned at a bottom surface to the first pair of threaded openings, and the another end of the second channel of the first and second pedestals are aligned at the bottom surface to the second pair of threaded openings. In any or all of the preceding examples, additionally or optionally, the first and second transverse channels are coupled on one end to an inlet of a lubricating oil passage returning lubricating oil from the corresponding turbocharger to a sump, and wherein the third and fourth transverse channels are coupled on one end to an outlet of another lubricating oil passage delivering lubricating oil to the corresponding turbocharger from the sump.

Another example turbocharged engine system, comprises: a rectangular base having a first set of oil channels extending forwards along a longitudinal axis from a sloping, first face of a rear surface of the base towards a rectilinear, second face of the rear surface, a pair of projections extending from first and second side surfaces of the base; and, a first set of coolant channels extending along a latitudinal axis, perpendicular to the longitudinal axis, from the first side surface to the second side surface of the base, a pair of charge air coolers correspondingly mounted on the pair of projections, the pair of charge air coolers having a second set of coolant channels in fluid communication with the first set of coolant channels of the base, a pair of pedestals mounted on a top surface of the base, a rear surface of the pair of pedestals aligned with the rear surface of the base, a bottom surface of the pair of pedestals resting on a top surface of the base, the pair of pedestals having a second set of oil channels in fluid communication with the first set of oil channels of the base, a pair of turbochargers correspondingly mounted on the pair of pedestals, a first plenum connecting a first of the pair of turbochargers to a first of the pair of charge air; a second plenum connecting a second of the pair of turbochargers to a second of the pair of charge air coolers, a lubricating oil circuit in fluid communication with the turbochargers via each of the first and second set of oil channels, and a coolant system in fluid communication with the charge air coolers via each of the first and second set of coolant channels. In any preceding example, additionally or optionally, the second set of oil channels includes a primary channel aligned with a central axis of a corresponding pedestal and a secondary oil channel offset from the central axis and parallel to the primary channel, the secondary oil channel narrower than the primary oil channel, wherein lubricating oil is transported through the primary channel to an oil inlet of a corresponding turbocharger mounted on the corresponding pedestal. In any or all of the preceding examples, additionally or optionally, the first set of oil channels includes another primary channel that extends from the rear surface of the base into the primary oil channel of the second set of channels, the primary oil channel and the another primary oil channel having a common diameter, and another secondary oil channel that extends from the rear surface of the base into the secondary oil channel of the second set of channels, the secondary oil channel and the another secondary oil channel having another common diameter. In any or all of the preceding examples, additionally or optionally, lubricating oil received in the another primary oil channel from a lubricating oil reservoir of the lubricating oil circuit is transported to the primary channel, and wherein lubricating oil received in the another secondary channel from the secondary channel is transported to the lubricating oil reservoir of the coolant system. In any or all of the preceding examples, additionally or optionally, the first set of coolant channels include a first coolant channel in fluidic communication with an inlet of the first charge air cooler, a second coolant channel in fluidic communication with an inlet of the second charge air cooler, a third coolant channel in fluidic communication with an outlet of the first charge air cooler; and a fourth channel in fluidic communication with each of an outlet of the second charge air cooler and the third coolant channel, wherein the second coolant channel extends from the first side surface to the second side surface via a cavity formed in the base and the third coolant channel extends from the first side surface to the second side surface passing through a cylindrical bracket attached to the base, the second coolant channel rearward relative to the third coolant channel. In any or all of the preceding examples, additionally or optionally, the rectangular base has a semi-circular cutout, wherein the front face of the base is concave, and wherein a front face of the pair of pedestals tapers from the top surface towards the bottom surface such that a width of the pair of the pedestals is larger at the bottom surface relative to the top surface. In any or all of the preceding examples, additionally or optionally, the rear surface of the base includes a first projection extending rearwards from the another primary channel, and a second projection extending rearwards from the another secondary channel, the first projection wider than the second projection, the second projection extending rearwards by a larger amount than the first projection. In any or all of the preceding examples, additionally or optionally, the rectangular base includes a plurality of fins on a bottom surface.

Yet another example system, comprises: a turbocharger mounting bracket having a stepped rear surface with a second, outer step 1415 extending rearwards from a first, inner step 1419 as shown at FIG. 14, and a plurality of coolant channels running laterally through the bracket between a first side surface and a second, opposite side surface of the bracket and into a charge air cooler at least partially supported by a projection extending from the first side surface of the bracket, a pedestal mounted on a top surface of the mounting bracket for supporting a turbocharger coupled to the charge air cooler, and a plurality of fins extending downwards from a bottom surface of the bracket. In any preceding example, additionally or optionally, the charge air cooler is a first charge air cooler, and the plurality of coolant channels include: a main coolant inlet channel bifurcating into a first coolant inlet channel and a second coolant inlet channel, the first coolant inlet channel entering an inlet of the first charge air cooler, a second coolant inlet channel running through the second outer step from the first side surface to an inlet of the second charge air cooler, a first coolant outlet channel exiting from an outlet of the first charge air cooler and running through the second outer step to the second side surface, and a second outlet channel exiting from an outlet of the second charge air cooler and merging with the first coolant channel to form a main coolant outlet channel, wherein the second coolant inlet channel and the first coolant outlet channel are parallel to one another and to a lateral axis of the bracket, and wherein the first coolant outlet channel is positioned rearwards relative to the second coolant inlet channel. In any or all preceding example, the system further comprising, additionally or optionally, a pair of auxiliary coolant channels including a first auxiliary inlet channel delivering coolant drawn from the first coolant channel into a coolant inlet of the turbocharger coupled to the first charge air cooler, and a second auxiliary outlet channel delivering coolant drawn from a coolant outlet of the turbocharger into the second coolant channel.

The invention claimed is:
1. A system, comprising:
a rectangular base with an arcuate cutout along one long side of the rectangular base for engaging with an intake manifold, the rectangular base including a respective platform projecting out from two short sides of the rectangular base for engaging with respective charge air coolers; and
a first pedestal and a second pedestal positioned on a top surface of the base, each of the first pedestal and the second pedestal having a respective tapered front surface facing the arcuate cutout on the one long side of the rectangular base and a rectilinear back surface aligned with another long side of the rectangular base, the first pedestal supporting a first turbocharger mounted thereon, the second pedestal supporting a second turbocharger mounted thereon;

wherein each of the first pedestal and the second pedestal further respectively includes at least two channels running through a pedestal body, the at least two channels coupled to corresponding channels extending through the rectangular base.

2. The system of claim 1, wherein the first pedestal is positioned towards one of the two short sides of rectangular the base and the second pedestal is positioned towards another one of the two short sides of the rectangular base, the first pedestal and the second pedestal aligned on either side of the arcuate cutout.

3. The system of claim 1, wherein for each pedestal of the first pedestal and the second pedestal, the at least two channels running through the pedestal body include a first central channel running along a central longitudinal axis and a second side channel running parallel to the first central channel and positioned offset from the central longitudinal axis.

4. The system of claim 3, wherein the first central channel has a larger diameter than the second side channel.

5. The system of claim 3, wherein the first central channel is coupled on one end at the top surface of the pedestal body to a lubricating oil outlet of a corresponding one of the first turbocharger or the second turbocharger mounted on the pedestal body; and wherein the second side channel is coupled on the one end at the top surface to a lubricating oil inlet corresponding to the one of the first turbocharger or the second turbocharger.

6. The system of claim 5, wherein the at least two channels correspondingly extending through the rectangular base include first and second primary transverse channels and third and fourth secondary transverse channels, each of the first, second, third, and fourth transverse channels extending along a latitudinal axis of the rectangular base from a first face of a rear surface of the rectangular base along the another long side towards a second face of the rear surface of the rectangular base along the one long side, each of the first, second, third, and fourth transverse channels perpendicular to each of the first and second channels of the first pedestal and the second pedestal.

7. The system of claim 6, wherein the rectangular base further includes a first pair of threaded openings coupled to the first and second primary transverse channels and projecting out of the first face of the rear surface; and a second pair of threaded openings coupled to the third and fourth secondary transverse channels and projecting further out of the first face of the rear surface relative to the first pair of threaded openings, the second pair of threaded openings having a smaller diameter than the first pair of threaded openings.

8. The system of claim 7, wherein the first pedestal and the second pedestal are positioned on the rectangular base such that another ends of the first channels of the first pedestal and the second pedestal are aligned at a bottom surface to the first pair of threaded openings, and another ends of the second channels of the first pedestal and the second pedestal are aligned at the bottom surface to the second pair of threaded openings.

9. The system of claim 7, wherein the first and second transverse channels are coupled on one end to an inlet of a lubricating oil passage coupled to return lubricating oil from the corresponding one of the first turbocharger or second turbocharger to a sump; and wherein the third and fourth transverse channels are coupled on one end to an outlet of another lubricating oil passage coupled to deliver the lubricating oil to the corresponding one of the first turbocharger or the second turbocharger from the sump.

10. A turbocharged engine system, comprising:
a rectangular base having a first set of lubricant channels extending forwards along a longitudinal axis from a sloping, first face of a rear surface of the base towards a rectilinear, second face of the rear surface, a pair of projections respectively extending from first and second side surfaces of the base; and, a first set of coolant channels extending along a latitudinal axis, perpendicular to the longitudinal axis, from the first side surface to the second side surface of the base;
a pair of charge air coolers correspondingly mounted on the pair of projections, the pair of charge air coolers having a second set of coolant channels in fluid communication with the first set of coolant channels of the base;
a pair of pedestals mounted on a top surface of the base, a rear surface of the pair of pedestals aligned with the rear surface of the base, a bottom surface of the pair of pedestals resting on a top surface of the base, the pair of pedestals having a second set of lubricant channels in fluid communication with the first set of lubricant channels of the base;
a pair of turbochargers correspondingly mounted on the pair of pedestals;
a first plenum connecting a first of the pair of turbochargers to a first of the pair of charge air coolers;
a second plenum connecting a second of the pair of turbochargers to a second of the pair of charge air coolers;
a lubricant circuit in fluid communication with the turbochargers via each of the first and second set of lubricant channels; and
a coolant system in fluid communication with the charge air coolers via each of the first and second set of coolant channels.

11. The system of claim 10, wherein the second set of lubricant channels includes a primary channel aligned with a central axis of a corresponding pedestal and a secondary lubricant channel offset from the central axis and parallel to the primary channel, the secondary lubricant channel narrower than the primary lubricant channel; and wherein lubricant is transported through the primary channel to a lubricant inlet of a corresponding turbocharger mounted on the corresponding pedestal.

12. The system of claim 11, wherein the first set of lubricant channels includes another primary channel that extends from the rear surface of the base into the primary lubricant channel of the second set of channels, the primary lubricant channel and the another primary lubricant channel having a common diameter, and another secondary lubricant channel that extends from the rear surface of the base into the secondary lubricant channel of the second set of channels, the secondary lubricant channel and the another secondary lubricant channel having another common diameter.

13. The system of claim 11, wherein the rectangular base includes a plurality of fins on a bottom surface.

14. The system of claim 12, wherein lubricant received in the other primary lubricant channel from a lubricant reservoir of the lubricant circuit is transported to the primary channel, and wherein lubricant received in the another secondary channel from the secondary channel is transported to the lubricant reservoir of the coolant system.

15. The system of claim 12, wherein the rear surface of the base includes a first projection extending rearwards from the another primary channel, and a second projection extending rearwards from the another secondary channel, the first projection wider than the second projection, the second projection extending rearwards by a larger amount than the first projection.

16. The system of claim 10, wherein the first set of coolant channels includes a first coolant channel in fluidic communication with an inlet of the first charge air cooler, a second coolant channel in fluidic communication with an inlet of the second charge air cooler, a third coolant channel in fluidic communication with an outlet of the first charge air cooler, and a fourth coolant channel in fluidic communication with each of an outlet of the second charge air cooler and the third coolant channel, wherein the second coolant channel extends from the first side surface to the second side surface via a cavity formed in the base and the third coolant channel extends from the first side surface to the second side surface passing through a cylindrical bracket attached to the base, the second coolant channel rearward relative to the third coolant channel.

17. The system of claim 10, wherein the rectangular base has a semi-circular cutout, wherein the front face of the base is concave, and wherein a front face of the pair of pedestals tapers from the top surface towards the bottom surface such that a width of the pair of the pedestals is larger at the bottom surface relative to the top surface.

18. A system, comprising:
   a turbocharger mounting bracket having a stepped rear surface with a second, outer step extending rearwards from a first, inner step; and
   a plurality of coolant channels running laterally through the bracket between a first side surface and a second, opposite side surface of the bracket and into a charge air cooler at least partially supported by a projection extending from the first side surface of the bracket;
   a pedestal mounted on a top surface of the mounting bracket for supporting a turbocharger coupled to the charge air cooler; and
   a plurality of fins extending downwards from a bottom surface of the bracket.

19. The system of claim 18, wherein the charge air cooler is a first charge air cooler, and the plurality of coolant channels include:
   a main coolant inlet channel bifurcating into a first coolant inlet channel and a second coolant inlet channel, the first coolant inlet channel entering an inlet of the first charge air cooler;
   a second coolant inlet channel running through the second outer step from the first side surface to an inlet of the second charge air cooler;
   a first coolant outlet channel exiting from an outlet of the first charge air cooler and running through the second outer step to the second side surface; and
   a second outlet channel exiting from an outlet of the second charge air cooler and merging with the first coolant channel to form a main coolant outlet channel;
      wherein the second coolant inlet channel and the first coolant outlet channel are parallel to one another and to a lateral axis of the bracket; and
      wherein the first coolant outlet channel is positioned rearwards relative to the second coolant inlet channel.

20. The system of claim 18, further comprising:
   a pair of auxiliary coolant channels including a first auxiliary inlet channel configured to deliver coolant drawn from the first coolant channel into a coolant inlet of the turbocharger coupled to the first charge air cooler; and
   a second auxiliary outlet channel configured to deliver coolant drawn from a coolant outlet of the turbocharger into the second coolant channel.

\* \* \* \* \*